United States Patent
El Khamy et al.

(10) Patent No.: US 8,897,399 B2
(45) Date of Patent: Nov. 25, 2014

(54) COMMUNICATION SYSTEM WITH SIGNAL-TO-NOISE RATIO ADJUSTMENT MECHANISM AND METHOD OF OPERATION THEREOF

(71) Applicant: Samsung Electronics Co., Ltd., Gyeonggi-Do (KR)

(72) Inventors: Mostafa El Khamy, San Diego, CA (US); Jinhong Wu, San Diego, CA (US); Heejin Roh, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/788,603

(22) Filed: Mar. 7, 2013

(65) Prior Publication Data

US 2013/0235957 A1 Sep. 12, 2013

Related U.S. Application Data

(60) Provisional application No. 61/607,691, filed on Mar. 7, 2012, provisional application No. 61/607,698, filed on Mar. 7, 2012.

(51) Int. Cl.
*H04L 27/06* (2006.01)
*H04L 1/00* (2006.01)

(52) U.S. Cl.
CPC ............ *H04L 1/0054* (2013.01); *H04L 1/0051* (2013.01)
USPC ........... 375/341; 375/262; 375/340; 714/794; 714/795; 714/796

(58) Field of Classification Search
CPC ..................................................... H04L 1/0054
USPC ........... 375/262, 340, 341; 714/794, 795, 796
See application file for complete search history.

(56) References Cited

U.S. PATENT DOCUMENTS

| 6,888,901 | B2 | 5/2005 | Yu et al. | |
| 6,968,021 | B1 | 11/2005 | White et al. | |
| 7,032,156 | B2 | 4/2006 | Yu et al. | |
| 7,209,527 | B2 * | 4/2007 | Smith et al. | 375/341 |
| 7,246,295 | B2 * | 7/2007 | Xu | 714/755 |
| 8,064,548 | B2 * | 11/2011 | Sundberg et al. | 375/341 |
| 2001/0055334 | A1 | 12/2001 | Tiedemann, Jr. et al. | |
| 2005/0111564 | A1 | 5/2005 | Kramer et al. | |
| 2010/0329320 | A1 | 12/2010 | Umehara et al. | |
| 2011/0258494 | A1 | 10/2011 | Van Den Bossche | |

OTHER PUBLICATIONS

International Search Report mailed Jun. 27, 2013, for PCT application No. PCT/KR2013/001855.
U.S. Appl. No. 13/523,824, filed Jun. 14, 2012 in the name of Au Yeung et al.

(Continued)

*Primary Examiner* — Leon Flores
(74) *Attorney, Agent, or Firm* — IP Investment Law Group

(57) ABSTRACT

A communication system includes: a module configured to decode a remainder portion of a receiver message using a mechanism with a compensation channel value calculated from decoding an evaluation portion of the receiver message with a different mechanism, or using a mechanism-controller generated using a mismatch characterization based on determining a partial-sensitive output and a partial-insensitive output, or a combination thereof for communicating with a device.

30 Claims, 6 Drawing Sheets

(56) References Cited

OTHER PUBLICATIONS

Kei, C. and Mow, W. H., "A class of switching turbo decoders against severe SNR mismatch", 2002 IEEE 56th vehicular technology conference, VTC 2002 Fall.

Bahl, L. et al., "Optical decoding of linear codes for minimizing symbol error rate", IEEE Trans. Inform. Theor, vol. 20, pp. 284-287, Mar. 1974.

\* cited by examiner

COMMUNICATION SYSTEM WITH SIGNAL-TO-NOISE RATIO ADJUSTMENT MECHANISM AND METHOD OF OPERATION THEREOF

CROSS-REFERENCE TO RELATED APPLICATION(S)

This application claims the benefit of U.S. Provisional Patent Application Ser. No. 61/607,691 and 61/607,698, both filed Mar. 7, 2012, and the subject matter thereof is incorporated herein by reference thereto.

TECHNICAL FIELD

An embodiment of the present invention relates generally to a communication system, and more particularly to a system with signal-to-noise ratio based adjustment mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a communication system with signal-to-noise ratio based adjustment mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: an initial-set module configured to determine an enhancement a-posteriori ratio based on decoding an evaluation portion of a receiver message using a mismatch-insensitive mechanism limited by an initial run threshold; an estimation module, coupled to the initial-set module, configured to calculate a mismatch estimation with a control unit based on the enhancement a-posteriori ratio; a compensation module, coupled to the estimation module, configured to determine a compensation channel value and a compensation extrinsic data using the mismatch estimation; and a remaining-set module, coupled to the compensation module, configured to decode a remainder portion of the receiver message using a mismatch-sensitive mechanism with the compensation channel value and the compensation extrinsic data for communicating with a device.

An embodiment of the present invention provides a communication system, including: a partial-calculation module configured to determine a partial-sensitive output and a partial-insensitive output for a receiver message; a characterization module, coupled to the partial-calculation module, configured to calculate a mismatch characterization with a control unit using the partial-log output and the partial-max output; and a selection module, coupled to the partial-calculation module, configured to generate a mechanism-controller based on the mismatch characterization for communicating with a device.

An embodiment of the present invention provides a method of operation of a communication system including: determining an enhancement a-posteriori ratio based on decoding an evaluation portion of a receiver message using a mismatch-insensitive mechanism limited by an initial run threshold; calculating a mismatch estimation with a control unit based on the enhancement a-posteriori ratio; determining a compensation channel value and a compensation extrinsic data using the mismatch estimation; and decoding a remainder portion of the receiver message using a mismatch-sensitive mechanism with the compensation channel value and the compensation extrinsic data for communicating with a device.

An embodiment of the present invention provides a method of operation of a communication system including: determining a partial-sensitive output and a partial-insensitive output for a receiver message; calculating a mismatch characterization with a control unit using the partial-log output and the partial-max output; and generating a mechanism-controller based on the mismatch characterization for communicating with a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
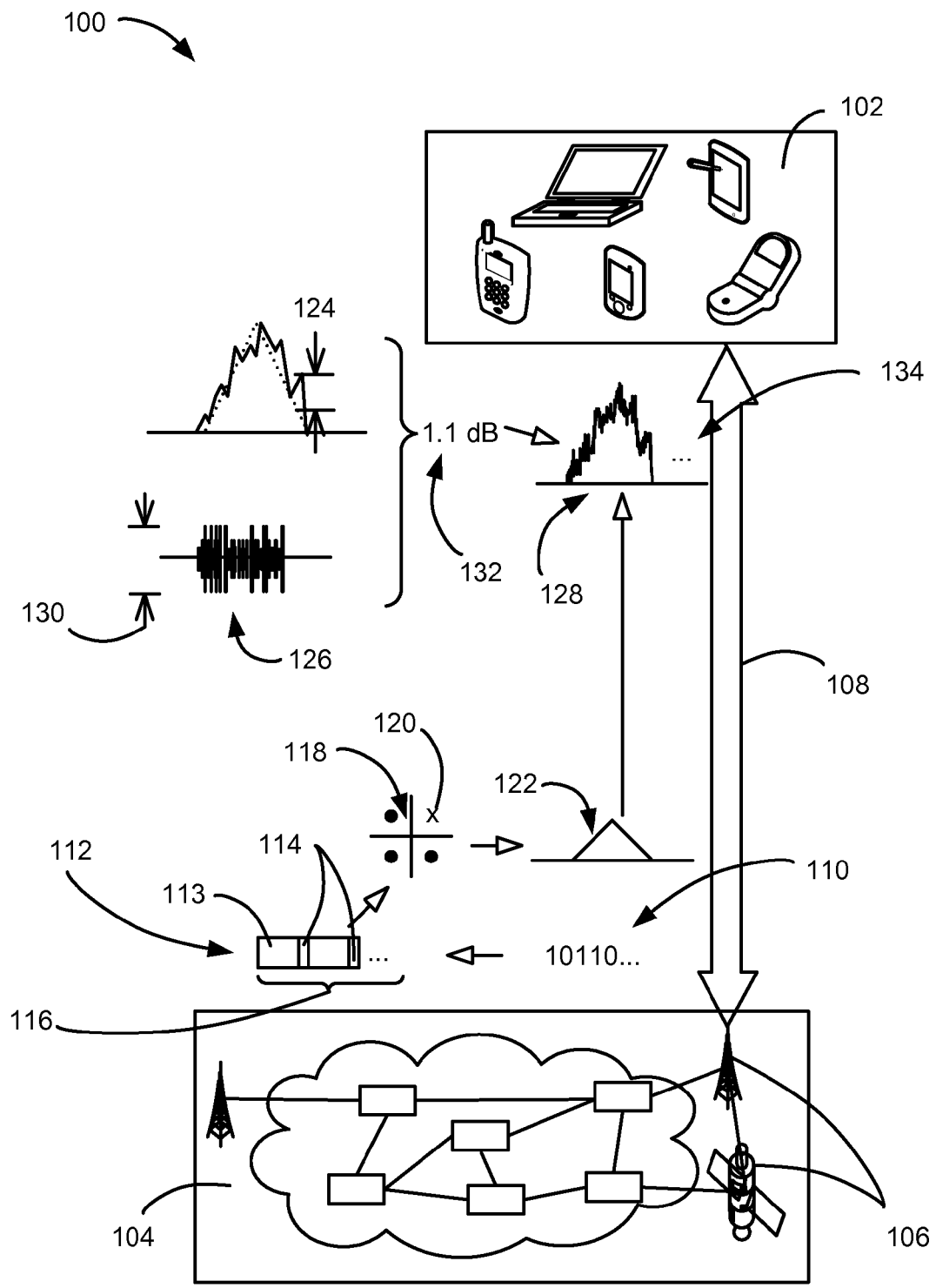
FIG. 1 is a communication system with signal-to-noise ratio based adjustment mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

The following embodiments can be used to adaptively utilize a mismatch-sensitive mechanism and a mismatch-insensitive mechanism to decode a receiver message. For one example embodiment, the receiver message can be partially decoded for an evaluation portion limited by an initial run threshold. For a more specific example, the initial run threshold can limit the partial decoding to one or more instances of a full iteration.

Continuing with the example embodiment, the partial decoding can utilize a mismatch-insensitive mechanism. Results of the partial decoding can be used to calculate a mismatch estimation between an actual and estimated instances of signal-noise ratio for the receiver message. The mismatch estimation can be used to determine a compensation channel value, a compensation extrinsic data, or a combination thereof. Remainder portion of the receiver message can be decoded using the compensation channel value, the compensation extrinsic data, or a combination thereof based on a mismatch-sensitive mechanism.

Decoding the evaluation portion limited by the initial run threshold using the mismatch-insensitive mechanism, and decoding the remainder portion using the mismatch-sensitive mechanism provides lower error rates. Further, the mismatch estimation, the compensation channel value, and the compensation extrinsic data provide increased robustness without significant extra complexity and provide processing efficiency.

For further example embodiment, the receiver message can be partially decoded for the evaluation portion limited by a partial-decode controller. For a more specific example, the partial-decode controller can limit the partial decoding to one or more instances of a half iteration.

Continuing with the example embodiment, the partial decoding can be done using both the mismatch-sensitive mechanism and the mismatch-insensitive mechanism to calculate a partial-insensitive output and a partial-sensitive output. The partial-insensitive output and the partial-sensitive output can be used to determine a mismatch characterization, which can be compared to a selection range to determine a mechanism-controller. The mechanism-controller can be used to determine appropriate mechanism for decoding the receiver message.

The mismatch characterization, the partial-insensitive output, and the partial-sensitive output provide lower complexity and required resources for characterizing a mismatch in the actual and the estimated instances of the signal-noise ratio. Moreover, the mismatch characterization, a logarithmic-probability mechanism, and a maximum-probability mechanism provide lower error rates by selecting an appropriate decoding mechanism based on a test. Further, the partial-sensitive output and the partial-insensitive output determined with the partial-decode controller corresponding to the half iteration provide decreased error rate while maintaining or reducing the processing burden and increased flexibility in decoding the receiver message.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with signal-to-noise ratio based adjustment mechanism in an embodiment of the present invention. The communication system 100 includes a mobile device 102, such as a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer.

The mobile device 102 can connect to and communicate with other devices, such as other mobile devices, servers, computers, telephones, or a combination thereof. The mobile device 102 can communicate with other devices by transmitting signals, receiving signals, processing signals, or a combination thereof and displaying a content of the signals, audibly recreating sounds according to the content of the signals, processing according to the content, such as storing an application or updating an operating system.

The base station 106 can be used to wirelessly exchange signals for communication, including voice signals of a telephone call or data representing a webpage and interactions therewith. The base station 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), or methods deployed by the Third Generation Partnership Project (3GPP), High Speed Packet Access (HSPA), Long Term Evolution (LTE), or fourth generation (4G) standards, or next generation communications standards or data storage devices, the communication signals can include reference portions, header portions, format portions, error correction or detection portion, or a combination thereof imbedded in the communicated information. The reference portions, header portions, format portions error correction or detection portion, or a combination thereof can include a predetermined bit, pulse, wave, symbol, or a combination thereof. The various portions can be embedded within the communicated signals at regular time intervals, frequency, code, or a combination thereof.

The mobile device 102 can communicate with the base station 106 through a channel 108. The channel 108 can be wireless, wired, or a combination thereof. The channel 108 can be a direct link between the mobile device 102 and the base station 106 or can include repeaters, amplifiers, or a combination thereof. For example, the channel 108 can include communication frequency, time slot, packet designation, transmission rate, channel code, or a combination thereof used for transmitting signals between the mobile device 102 and the base station 106.

The communication system 100 can process and communicate a target message 110 between devices. The target message 110 is data intended to communicate by reproduction or processing at a receiving device. The target message 110 can represent a sound, an instruction or a process, an image, or a combination thereof. The target message 110 can be binary bits indicating the sound, the instruction or the process, the image, or a combination thereof.

The communication system 100 can divide or group portions of the target message 110, interweave portions of the target message 110, or a combination thereof according to a method or process predefined by the communication system 100 to determine a code-word 112. The code-word 112 is a unit of information having a length predetermined by the communication system 100 for communicating information between devices.

The code-word 112 can include a systematic portion 113, a parity portion 114, or a combination thereof. The systematic portion 113 is information representing the target message 110 or a portion therein. The systematic portion 113 can further include information regarding the format, such as data rate, identification for modulation or coding method, reference portion, sender or receiver information, or a combination thereof.

The parity portion 114 is data appended to a set of data for checking or forward-error-correcting information for estimating or correcting the set of data. The code-word 112 can have the parity portion 114 corresponding to portion of the target message 110 contained therein.

The communication system 100 can further determine a segment 116 including instances of the code-word 112 for communicating the target message 110. The segment 116 is a unit of information having a length greater than the code-word 112 as predetermined by the communication system 100 for communicating information between devices. The segment 116 can be a grouping of instances of the code-word 112 in time, frequency, or a combination thereof.

The communication system 100 can use a modulation scheme 118 to determine a symbol 120 corresponding to the code-word 112 or a portion therein. The modulation scheme 118 is a system of physical variations or measureable attributes in the carrier signal for conveying information between devices.

The modulation scheme 118 can include threshold, range, data rate, signal shape, or a combination thereof for instances of the symbol 120 representing specific information, such as '1', '0', or a specific combination thereof. For example, the modulation scheme 118 can include a frequency range, a phase range, a signal shape, carrier frequency, data rate, or a combination thereof for instances of the symbol 120 representing '00', '01', 10', or '11'.

The modulation scheme 118 can include analog or digital modulation methods, such as amplitude modulation or various keying techniques. For example, the modulation scheme 118 can include quadrature amplitude modulation (QAM), phase-shift keying (PSK), such as quadrature PSK (QPSK), frequency-shift keying (FSK), amplitude-shift keying (ASK), variations thereof, or a combination thereof.

The communication system 100 can use instances of the symbol 120 to transmit a transmitter message 122. The transmitter message 122 can change while traversing through the channel 108 due to the qualities therein, such as from delayed signal reflections from various buildings, from interferences by other nearby transmitting sources, from the Doppler Effect experienced when the mobile device 102 is in transit, or a combination thereof.

The communication system 100 can characterize the effects on communication signals from the channel 108 using a channel quality 124. The channel quality 124 is a description of changes to signals caused by the channel 108. The channel quality 124 can describe and quantize reflection, loss, delay, refraction, obstructions, or a combination thereof a signal can experience while traversing between the base station 106 and the mobile device 102. The channel quality 124 can further characterize interference the mobile device 102 can experience from other transmitters, such as other mobile devices or other base stations, or from the movement of the mobile device 102.

The transmitter message 122 can further change due to a noise component 126 contributed by the channel 108, hardware components processing signals, or a combination thereof. The noise component 126 can include a characterization of changes from influences other than ones captured by the channel quality 124. The noise component 126 can also include changes in the signals due to hardware component limitations, such as tolerance levels or cross-talk between components. For example, the noise component 126 can be additive in nature and have a random Gaussian or Rayleigh distribution for the changes.

The communication system 100 can receive a receiver message 128. The receiver message 128 is information received by a device in the communication system 100. The receiver message 128 can be the transmitter message 122 altered by the qualities reflected by the channel quality 124 and altered by the noise component 126 due to traversing through the channel 108.

For example, the base station 106 can format and process the target message 110 into the code-word 112 having appropriate value of the parity portion 114. The base station 106 can determine one or more instances of the symbol 120 corresponding to the code-word 112 using the modulation scheme 118 and transmit the transmitter message 122. The transmitter message 122 can be affected while traversing a communication medium. The mobile station 102 can receive the receiver message 128 corresponding to the transmitter message 122 after traversing through the channel 108.

The communication between devices for the communication system 100 can be represented as:

$$y[n]=hx[n]+z[n]; \text{ for } n=0,\ldots,N-1. \quad \text{Equation (1).}$$

The receiver message 128 can be represented by 'y' and the 'x' can represent the transmitter message 122. The channel quality 124 can be represented by 'h' and the noise component 126 can be represented by 'z' for the 'nth' instance of the code-word 112 within a grouping, such as the segment 116, the transmitter message 122, or the target message 110, having a block size 134 of 'N'. The block size 134 can be a number of instances of the code-word 112 predetermined as a group by the communication system 100, such as a frame or a code-word block.

The noise component 126 can be expressed as a noise variance 130. The noise variance 130 is a statistical characteristic of the noise component 126. The noise variance 130 can be a measure of how far the noise component 126 is spread out. The communication system 100 can estimate the noise variance 130, which can be expressed using '$\tilde{\sigma}^2$'.

The communication system 100 can further estimate or calculate a signal-noise ratio 132. The signal-noise ratio 132 is a comparison between a level of a desired signal to a level of background noise.

For example, the signal-noise ratio 132 can be the comparison between the transmitter message 122, or a portion therein, and the receiver message 128, or a portion therein. Also for example, the signal-noise ratio 132 can be the comparison between portions of the receiver message, such as between the noise component 126 and a signal component remaining after removing the noise component 126, the channel quality 124, or a combination thereof from the receiver message 128.

For illustrative purposes, the communication system has been described as having the base station 106 transmit the transmitter message 122 and the mobile station 102 receive the receiver message 128. However, it is understood that the mobile station 106 can transmit the transmitter message 122, which can traverse the channel 108 and be received and processed by the base station 106.

Figure 2:
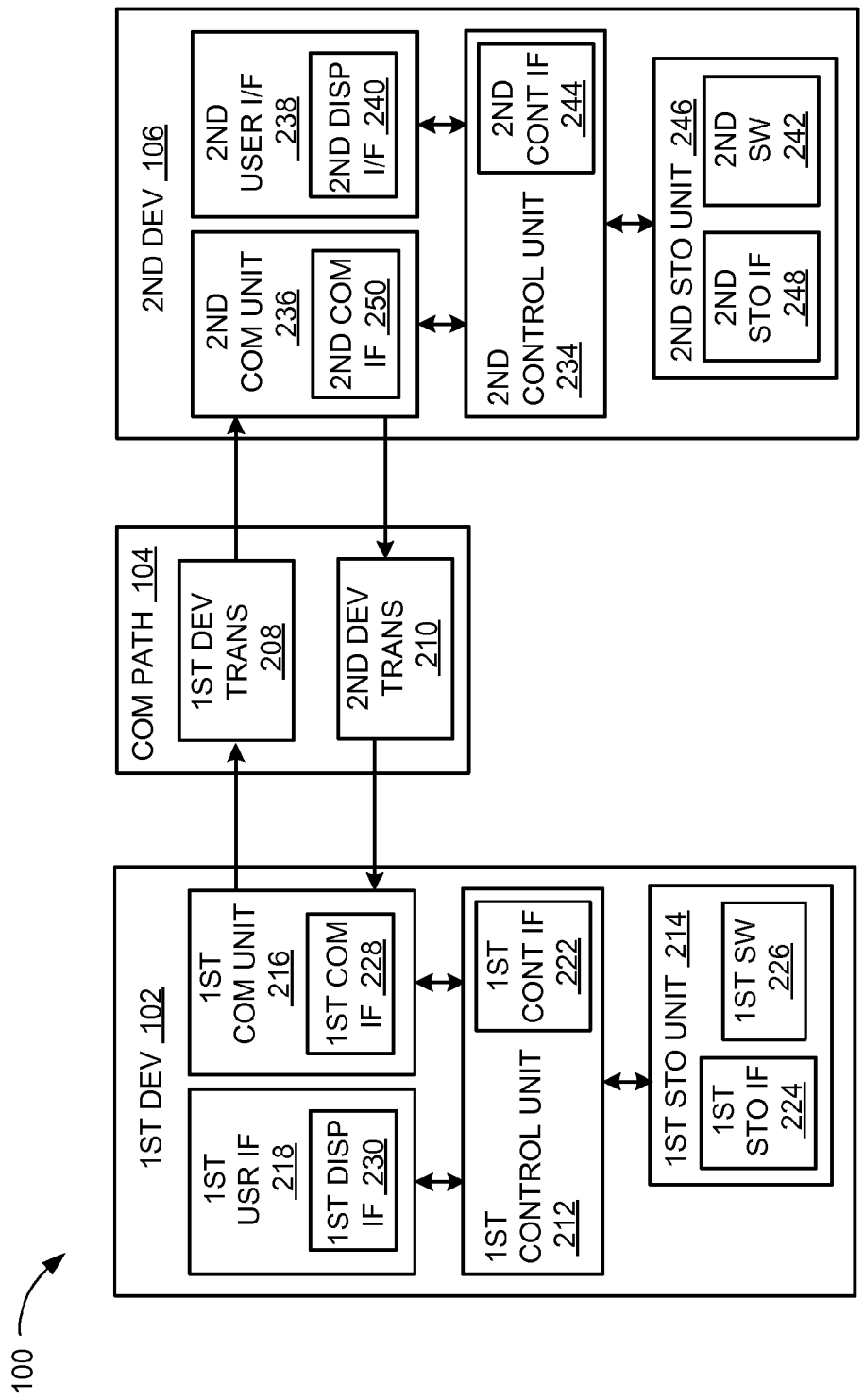
FIG. 2 is an exemplary block diagram of the communication system.

Referring now to FIG. 2, therein is shown an exemplary block diagram of the communication system 100. The communication system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as nonvolatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the communication system 100. The first control unit 212 can also execute the first software 226 for the other functions of the communication system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The communication system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 3:
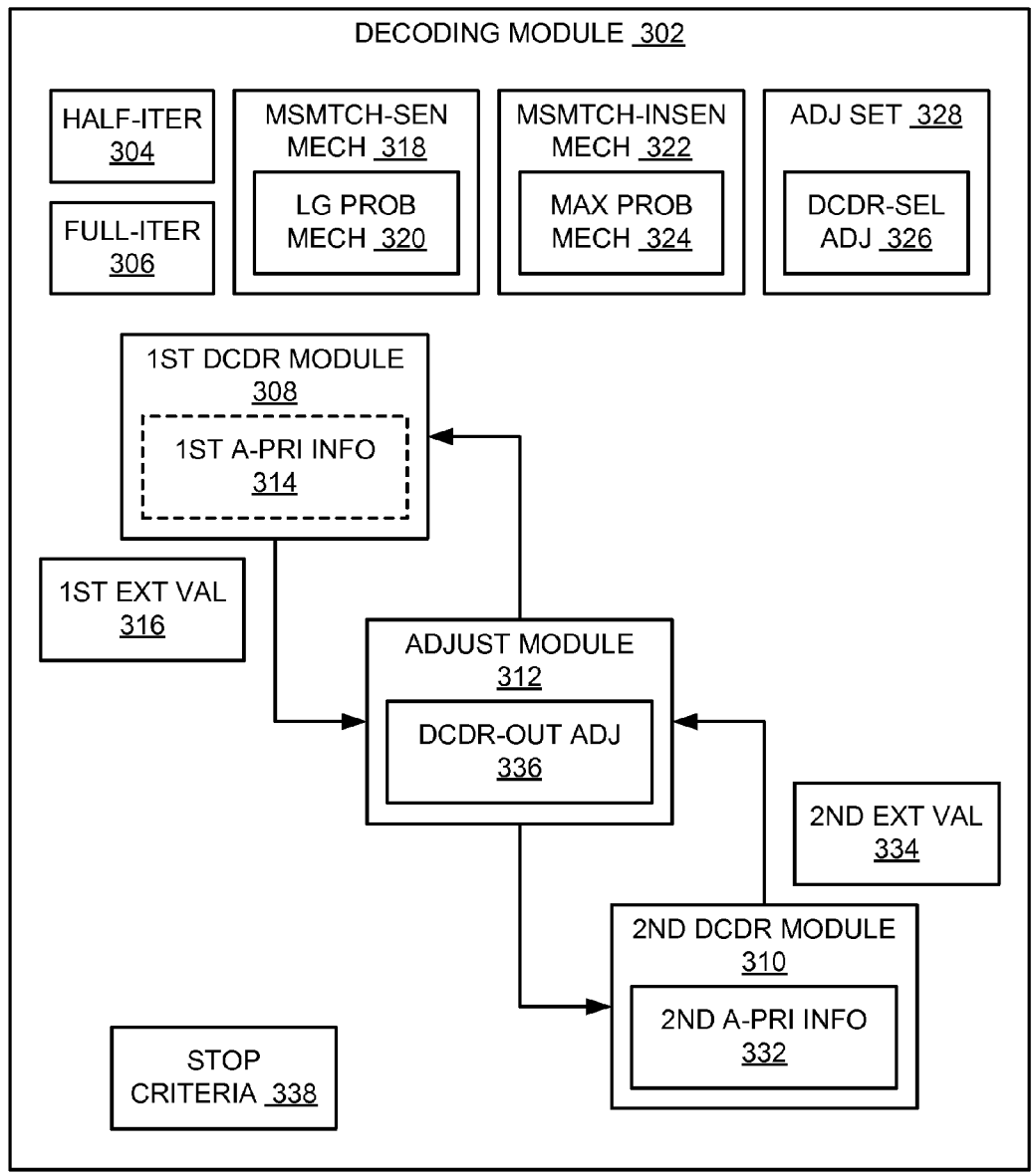
FIG. 3 is an example of a decoding module of the communication system of FIG. 1.

Referring now to FIG. 3, therein is shown an example of a decoding module 302 of the communication system 100 of FIG. 1. The decoding module 302 can be configured to decode the receiver message 128 of FIG. 1. The decoding module 302 process the receiver message 128 to correct errors and determine the target message 110 of FIG. 1 for further processing. The decoding module 302 can be used to implement turbo codes, such as used in Third Generation (3G) or Fourth Generation (4G) communication systems.

The decoding module 302 can decode the receiver message 128 after the receiver message 128 has been detected, demodulated, processed from symbols to bits, or a combination thereof. The decoding module 302 can analyze and process the receiver message 128 at a bit level by calculating likelihoods, ratios, or a combination thereof. The decoding module 302 can further interleave and de-interleave bit level information.

The decoding module 302 can process the receiver message 128 using an iterative scheme. The decoding module 302 can process one instance of the code-word 112 of FIG. 1 and repeat the process for all instances of the code-word 112 for the receiver message 128, the segment 116 of FIG. 1, a portion therein, or a combination thereof.

For example, the decoding module 302 can process one instance of the code-word 112 for a full iteration 304. The full iteration 304 can be steps or methods for completely processing one instance of the code-word 112. The full iteration 304 can include two instances of a half iteration 306 with of the two instances of the half iteration 306 performing same steps or methods.

The decoding module 302 can include a first decoder module 308, a second decoder module 310, and an adjustment module 312. The first decoder module 308 can be configured to statistically analyze and process the receiver message 128 at a bit level. The first decoder module 308 can statistically analyze and process the receiver message 128 by processing a first a-priori information 314 and a first extrinsic value 316.

The first a-priori information 314 is a prior knowledge for the first decoder module 308 about the receiver message 128, the transmitter message 122 of FIG. 1, a portion therein, such as bits, symbols, or the code-word 112, or a combination thereof. The first a-priori information 314 can be a ratio of likelihoods, a logarithmic derivation thereof, such as a log-likelihood ratio (LLR), or a combination thereof for a likelihood that a bit is '1' or '0' or a group of bits are a specific sequence of '1' and '0'.

The first a-priori information 314 can be expressed as:

$$L_a(b_k) \overset{\text{def}}{=} \ln\frac{p(b_k = 1)}{p(b_k = 0)}. \qquad \text{Equation (2).}$$

The first a-priori information 314 can be expressed using the opposite ratio, where $\ln(x)$ is the natural logarithm of x and p is the probability function. A portion of the receiver message 128, such as a bit, being processed by the first decoder module 308 can be expressed as '$b_k$', with 'k' corresponding to identification or sequential order of the portion of the receiver message 128.

The first decoder module 308 can initialize the first a-priori information 314 to a value predetermined by the communication system 100, a value resulting from demodulating or detecting the receiver message 128, a value resulting from estimating the channel quality 124 of FIG. 1, or a combination thereof. The first decoder module 308 can initialize or reset the first a-priori information 314 when the communication system 100 is initialized, reset, performs a handover process, or a combination thereof. The first decoder module 308 can further set the first a-priori information 314 to a value received from the second decoder module 310.

The first extrinsic value 316 is new information not derived from received information. The first extrinsic value 316 can be a calculated or estimated value. The first extrinsic value 316 can represent an error, an improvement, or a difference between instances of processing or calculated results.

For example, the first decoder module 308 can calculate an a-posteriori data, which can be a later knowledge for the corresponding module regarding the transmitter message 122, the receiver message 128, a bit therein, or a combination thereof. The a-posteriori data can be a measure of confidence level associated with a processed result matching a corresponding portion within the target message 110 by processing the receiver message 128 in light of the transmitter message 122 traversing through the channel 108 of FIG. 1. The a-posteriori data can account for the parity portion 114 of FIG. 1 in the code-word 112.

Continuing with the example, the first decoder module 308 can calculate the first extrinsic value 316 by taking the difference between the first a-priori information 314 and the a-posteriori data. The calculation of the a-posteriori data can be integral to calculating the extrinsic value. The first decoder module 308 can further use a mismatch-sensitive mechanism 318, such as a logarithmic-probability mechanism 320, or a mismatch-insensitive mechanism 322, such as a maximum-probability mechanism 324 to calculate the first extrinsic value 316.

The mismatch-sensitive mechanism 318 and the mismatch-insensitive mechanism 322 both are methods, sequences of steps, instructions, or processes, or a combination thereof for calculating extrinsic values. The mismatch-sensitive mechanism 318 can be characterized as having higher accuracy and producing lower error rate than the mismatch-insensitive mechanism 322 for smaller differences between an estimated instance of the signal-noise ratio 132 of FIG. 1 and an actual instance of the signal-noise ratio 132.

The logarithmic-probability mechanism 320 is a method, a sequence of steps, instructions, or processes, or a combination thereof for calculating extrinsic values. The logarithmic-probability mechanism 320 can be represented as:

$$\max{}^*(x,y)=\max(x,y)+\ln(1+e^{-(|x-y|)}). \quad \text{Equation (3)}.$$

The logarithmic-probability mechanism 320 can be represented by 'max*(x, y)', with 'x' and 'y' representing two logarithmic probabilities generated by the first decoder module 308, the second decoder module 310, or a combination thereof.

The maximum-probability mechanism 324 is a method, a sequence of steps, instructions, or processes, or a combination thereof different from the logarithmic-probability mechanism 320. The maximum-probability mechanism 324 can be simpler and less complex than the logarithmic-probability mechanism 320. The maximum-probability mechanism 324 can be represented as:

$$\max{}^*(x,y)=\max(x,y). \quad \text{Equation (4)}.$$

with 'x' and 'y' representing two logarithmic probabilities generated by the first decoder module 308, the second decoder module 310, or a combination thereof.

The first decoder module 308 can utilize the mismatch-sensitive mechanism 318. For example, the first decoder module 308 can use the logarithmic-probability mechanism 320 and operate as a log maximum a-posteriori probability (Log-MAP) decoder to calculate the first extrinsic value 316. The logarithmic-probability mechanism 320 can utilize the calculation or estimation of the noise variance 130 of FIG. 1, the signal-noise ratio 132, or a combination thereof.

The first decoder module 308 can also use the mismatch-insensitive mechanism 322, such as the maximum-probability mechanism 324, to approximate values produced using the logarithmic-probability mechanism 320. The first decoder module 308 can use the maximum-probability mechanism 324 and operate as a max-log-MAP (MLM) decoder. The first decoder module 308 using the maximum-probability mechanism 324 can produce the first extrinsic value 316 that produces a more stable decoding result when an estimate for the signal-noise ratio 132 is erroneous compared to an actual instance of the signal-noise ratio 132.

The first decoder module 308 can further estimate the first extrinsic value 316 using the logarithmic-probability mechanism 320, the maximum-probability mechanism 324, difference between the first a-priori information 314 and the a-posteriori data, or a combination thereof. The first decoder module 308 can implement the logarithmic-probability mechanism 320 using the maximum-probability mechanism 324 and a decoder-selection adjustment 326.

The decoder-selection adjustment 326 is a difference between values calculated using the mismatch-sensitive mechanism 318 and the mismatch-insensitive mechanism 322. For example, for the logarithmic-probability mechanism 320 and the maximum-probability mechanism 324, the decoder-selection adjustment 326 can be represented as:

$$\ln(1+e^{-(|x-y|)}). \quad \text{Equation (5)}.$$

The decoder-selection adjustment 326 can further be quantized approximations. The decoder-selection adjustment 326 can be implemented using lookup tables.

It has been discovered that the decoder-selection adjustment 326 implemented as quantized approximations and through lookup tables provide robustness without significant extra complexity and provide processing efficiency. The decoder-selection adjustment 326 implemented as quantized approximations and through lookup tables allow the communication system 100 to switch between the logarithmic-probability mechanism 320 and the maximum-probability mechanism 324 without requiring separate functional units dedicated to each mechanism and without reprocessing the same data for different mechanisms.

The first decoder module 308 can include an adjustment set 328. The adjustment set 328 is a set of values for selecting the decoder-selection adjustment 326 according to the transmitter message, the receiver message 128, estimation of the noise component 126 of FIG. 1 or the signal-noise ratio 132, estimation of the channel quality 124, any portion therein, or any combination thereof.

The first decoder module 308 can set the decoder-selection adjustment 326 as the value corresponding to estimated or detected information in the adjustment set 328. The first decoder module 308 can add the decoder-selection adjustment 326 to a value resulting from using the mismatch-insensitive mechanism 322, such as the maximum-probability mechanism 324, to calculate the first extrinsic value 316 according to the mismatch-sensitive mechanism, such as the logarithmic-probability mechanism 320.

It has been discovered that the decoder-selection adjustment 326 provides reduction in required hardware and processing efficiency. The decoder-selection adjustment 326 allows the same computational hardware to utilize both the mismatch-sensitive mechanism 318, including the logarithmic-probability mechanism 320, and the mismatch-insensitive mechanism 322, including the maximum-probability mechanism 324. The decoder-selection adjustment 326 can also be selected from the adjustment set 328 implemented as a look up table, which can reduce the computational burden during real-time processing.

The first decoder module 308 can use the first control unit 212 of FIG. 2, the second control unit 234 of FIG. 2, the first communication unit 216 of FIG. 2, the second communication unit 236 of FIG. 2, or a combination thereof to calculate or approximate the first a-priori information 314, the first extrinsic value 316, the a-posteriori data, or a combination thereof. The first decoder module 308 can store the first a-priori information 314, the first extrinsic value 316, the a-posteriori data, or a combination thereof in the first storage unit 214 of FIG. 2, the second storage unit 246 of FIG. 2, or a combination thereof.

The first decoder module 308 can use the first control interface 222 of FIG. 2, the second control interface 244 of FIG. 2, the first storage interface 224 of FIG. 2, the second storage interface 246 of FIG. 2, or a combination thereof to access the adjustment set 328, the first a-priori information 314, the receiver message 128, or a combination thereof stored in the first storage unit 214, the second storage unit 246, or a combination thereof. The first decoder module 308 can similarly access various mechanisms, such as the mismatch-sensitive mechanism 318 or the maximum-probability mechanism 324, any predetermined methods or steps, or a combination thereof in the first storage unit 214, the second storage unit 246, or a combination thereof.

The second decoder module 310 can be configured to statistically analyze and process the receiver message 128 at a bit level. The second decoder module 310 can statistically analyze and process the receiver message 128 by processing a second a-priori information 332 and a second extrinsic value 334.

The second a-priori information 332 is a prior knowledge for the second decoder module 310 about the receiver message 128, the transmitter message 122, a portion therein, such as bits, symbols, or the code-word 112, or a combination thereof. The second a-priori information 332 can be a ratio of likelihoods, a logarithmic derivation thereof, or a combination thereof for a likelihood that a bit is '1' or '0' or a group of bits are specific sequence of '1' and '0'. The second a-priori information 332 can be similar to the first a-priori information 314 and be expressed using Equation (2).

The second extrinsic value 334 is new information that is not derived from received information. The second extrinsic value 334 can be a calculated or estimated value. The second extrinsic value 334 can represent an error, an improvement, or a difference between instances of processing or calculated results.

The second decoder module 310 can be similar to the first decoder module 308. For example, the second decoder module 310 can initialize and set the second a-priori information 332 similar to the first decoder module 308 as described above. Also for example, the second decoder module 310 can calculate or approximate the a-posteriori data, the second extrinsic value 334, or a combination thereof using the mismatch-sensitive mechanism 318 or the mismatch-insensitive mechanism 322, such as the logarithmic-probability mechanism 320 or the maximum-probability mechanism 324, the decoder-selection adjustment 326, the adjustment set 328, or a combination thereof as described above for the first decoder module 308.

The second decoder module 310 can further be similar to the first decoder module 308 and use the first control unit 212, the second control unit 234, the first communication unit 216, the second communication unit 236, or a combination thereof to calculate or approximate the second a-priori information 332, the second extrinsic value 334, the a-posteriori data, or a combination thereof. The second decoder module 310 can store the second a-priori information 332, the second extrinsic value 334, the a-posteriori data, or a combination thereof in the first storage unit 214, the second storage unit 246, or a combination thereof.

The first extrinsic value 316, the second extrinsic value 334, or a combination thereof can be passed to the adjustment module 312. The adjustment module 312 can be configured to interleave and de-interleave the first extrinsic value 316, the second extrinsic value 334, or a combination thereof. The adjustment module 312 can interleave or de-interleave the first extrinsic value 316, the second extrinsic value 334, or a combination thereof by rearranging data, values, bits, or a combination thereof according to a method or a set of steps predetermined by the communication system 100.

The adjustment module 312 can further use a decoder-output adjustment 336 to adjust the first extrinsic value 316, the second extrinsic value 334, or a combination thereof. The decoder-output adjustment 336 is a scalar value, which can adjust a value resulting from use of the maximum-probability mechanism 324 to calculate the first extrinsic value 316, the second extrinsic value 334, or a combination thereof. For example, the decoder-output adjustment 336 can have a value between 0 and 1. For a more specific example, the decoder-output adjustment 336 can have a value of 0.7.

After interleaving, de-interleaving, adjusting, or a combination of processes thereof for the first extrinsic value 316 and the second extrinsic value 334, the adjustment module 312 can pass the processed results to the first decoder module 308 and the second decoder module 310. The adjustment module 312 can pass the first extrinsic value 316 to the second decoder module 310, pass the second extrinsic value 334 to the first decoder module 308, or a combination thereof.

For example, a first instance of the half iteration 306 can include the first decoder module 308 calculating the first extrinsic value 316, the second decoder module 310 calculating the second extrinsic value 334, or a combination thereof. The first decoder module 308, the second decoder module 310, or a combination thereof can decode a portion of the code-word 112 and decode the convolutional code consisting of the systematic portion 113 of FIG. 1 and the parity portion 114. The first decoder module 308, the second decoder module 310, or a combination thereof can decode half of the code-word 112 and process the corresponding portion within the parity portion 114.

The first instance of the half iteration 306 can further include the adjustment module 312 interleaving, de-interleaving, adjusting, or a combination of processes thereof for the first extrinsic value 316, the second extrinsic value 334, or a combination thereof. The adjustment module 312 can pass the updated instance of the first extrinsic value 316 to the second decoder module 310, pass the updated instance of the second extrinsic value 334 to the first decoder module 308, or a combination thereof to complete the first instance of the half iteration 306.

Continuing with the example, a second instance of the half iteration 306 included in the full iteration 304 can include the first decoder module 308 setting a received instance of the second extrinsic value 334 as the first a-priori information 314, the second decoder module 310 setting a received instance of the first extrinsic value 316 as the second a-priori information 332, or a combination thereof. The first decoder module 308, the second decoder module 310, or a combination thereof can process the updated instances of the a-priori information to calculate updated instances of the extrinsic value.

Continuing with the example, the adjustment module 312 can receive the updated instance of the first extrinsic value 316, the second extrinsic value 334, or a combination thereof. The adjustment module 312 can interleave, de-interleave, adjust, pass or a combination of processes thereof for the first extrinsic value 316, the second extrinsic value 334, or a combination thereof. The processes for the adjustment module 312 can complete the half iteration 306. Completing two instances of the half iteration 306 can complete the full iteration 304.

The decoding module 302 can process the receiver message 128 using instances of the full iteration 304 based on a stop criteria 338. The stop criteria 338 is a condition for completing or pausing processing of the receiver message 128. The stop criteria 338 can be a maximum limitation for instances of the full iteration 304, a pass or fail condition for an error checking process, based on input signal, such as an enable signal or a bit status, or a combination thereof.

The decoding module 302 can check for the stop criteria 338 at the end of each instance of the half iteration 306 or the full iteration 304. For example, the decoding module 302 can perform the error check or correction, such as a cyclic redundancy check or check sum, using the adjustment module 312 at the half iteration 306. Also for example, the decoding module 302 can compare a counter for executed instances of the full iteration 304 with the stop criteria 338.

The decoding module 302 can stop processing the receiver message 128 when the stop criteria 338 has been satisfied. The decoding module 302 can reset counters, initialize a-priori information, pass results to another module, or a combination thereof after the stop criteria 338 has been satisfied.

Figure 4:
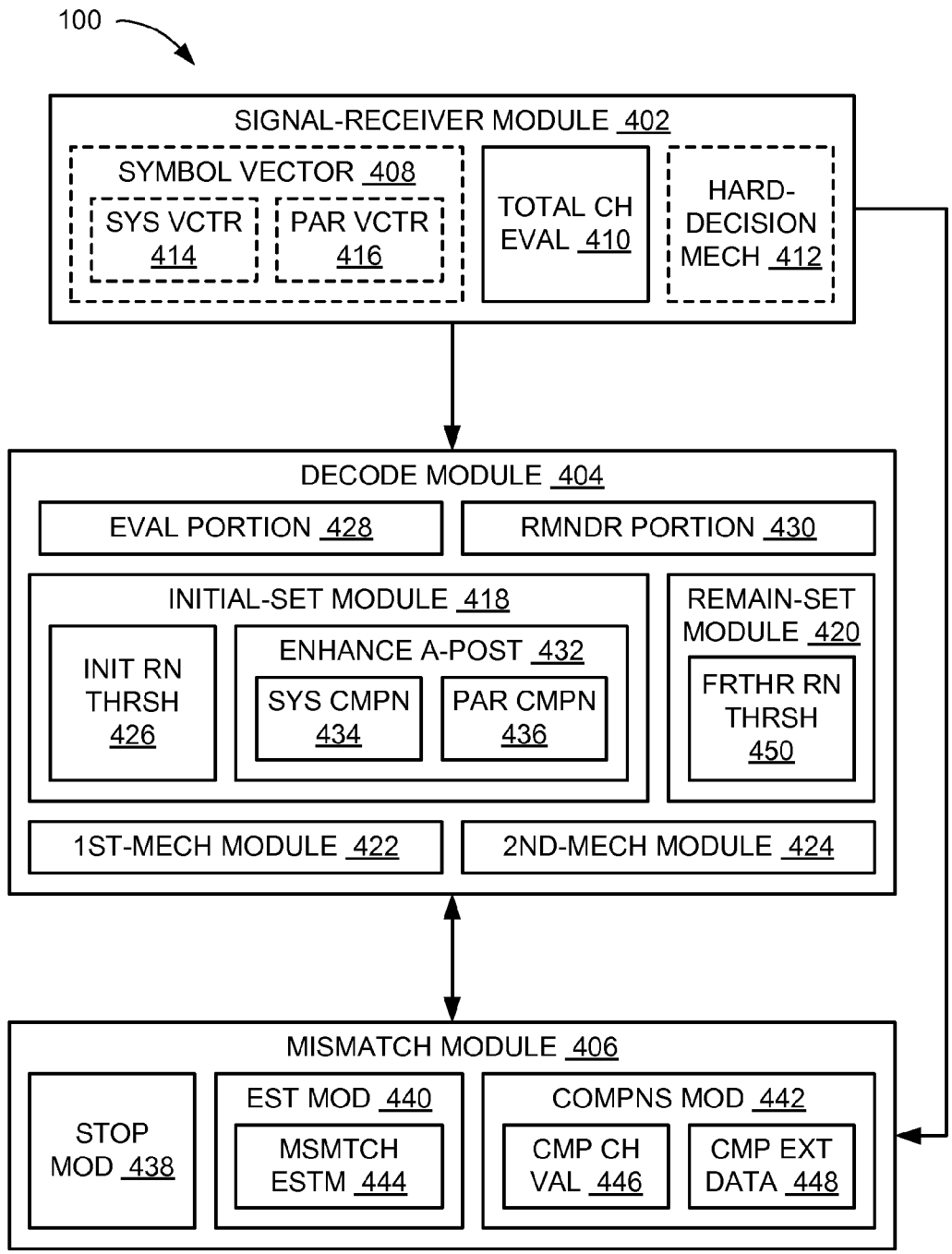
FIG. 4 is a control flow of the communication system.

Referring now to FIG. 4, therein is shown a control flow of the communication system 100. The communication system 100 can include a signal-receiver module 402, a decode module 404, and a mismatch module 406.

The signal-receiver module 402 can be coupled to the decode module 404. For example, one or more outputs of the signal-receiver module 402 can be connected to one or more inputs of the decode module 404, one or more inputs of the signal-receiver module 402 can be connected to one or more outputs of the decode module 404, or a combination thereof. Similarly, the decode module 404 can be coupled to the mismatch module 406.

The signal-receiver module 402 is configured to process one or more instance of the symbol 120 of FIG. 1 in the receiver message 128 of FIG. 1. The signal-receiver module 402 can process the receiver message 128 at the symbol level by characterizing the channel 108 of FIG. 1 and the noise component 126 of FIG. 1.

The signal-receiver module 402 can be configured to determine a symbol vector 408, a total channel evaluation 410, or a combination thereof from the receiver message 128. The channel evaluation 410 can be determined using:

$$L_{ch}(b_k) \approx \max_{x:b_k=+1}\left(-\frac{1}{\sigma^2}\|y-Hx\|^2 + \frac{1}{2}b(x_{[k]})^T L_{A,[k]}\right) - \max_{x:b_k=-1}\left(-\frac{1}{\sigma^2}\|y-Hx\|^2 + \frac{1}{2}b(x_{[k]})^T L_{A,[k]}\right).$$ Equation (6)

The total channel evaluation 410 can be represented as '$L_{ch}$' and the noise variance 130 of FIG. 1 can be represented as '$\sigma^2$'. The channel quality 124 can be represented by 'H' and '$L_{A,[k]}$' can represent the a-posteriori or extrinsic decoder data or combinations thereof, from previous iterations or half-iterations of decoding processes.

The signal-receiver module 402 can be configured to characterize the channel 108 and by determining the channel quality 124 of FIG. 1. The signal-receiver module 402 can determine the channel quality 124 by identifying a reference portion, such as a frequency, phase, timing, signal shape, content, or a combination thereof standardized and known to the communication system 100 in the receiver message 128.

The signal-receiver module 402 can determine the channel quality 124 as the change in the reference portion between the known or standardized reference signal and the reference portion in the receiver message 128. For example, the signal-receiver module 402 can determine the channel quality 124 as changes in magnitude, frequency, timing, phase, shape, code, or a combination thereof identified in the reference portion of the receiver message 128.

The signal-receiver module 402 can be configured to determine the noise component 126, an initial estimate of the noise variance 130, represented as '$N_0/2$' or '$\sigma^2$', or a combination thereof. The noise component 126, the initial estimate of the noise variance 130, or a combination thereof can be determined using the process similar to the one described above for determining the channel quality 124. The noise component 126, the initial estimate of the noise variance 130, or a combination thereof can be determined using dedicated hardware circuitry, signal processing methods, or a combination thereof.

The signal-receiver module 402 can determine instances of the symbol 120 in the receiver message 128. The signal-receiver module 402 can use a soft-decision mechanism, a hard-decision mechanism 412, or a combination thereof to determine the symbol 120. The hard-decision mechanism 412 is a method or a sequence of steps that require a classification or identification as to the identity of every input and output signal. For example, the signal-receiver module 402 can determine the identity of the symbol 120 according to the modulation scheme 118 of FIG. 1 for every input and output signal, for each iteration, or a combination thereof.

The soft decision can be a method or a sequence of steps that determine one or more likelihood for classification or identification of an input signal, output signal, or a combination thereof. For example, the signal-receiver module 402 can determine the log-likelihood ratio that the signal in the receiver message 128 corresponds to various symbols within the modulation scheme.

The signal-receiver module 402 can determine the symbol vector 408 using one or more instances of the symbol 120 determined in the receiver message 128. The symbol vector 408 can be information regarding different symbols within the receiver message 128. For example, the symbol vector 408, represented by '$[r_s\ r_p]$', can be a pairing of vectors corresponding to a systematic vector 414 and a parity vector 416.

The systematic vector 414 is one or more vector for the symbol 120 corresponding to the systematic portion 113 of FIG. 1, and can be represented by '$r_s$'. The parity vector 416 is one or more vectors for the symbol 120 corresponding to the parity portion 114 of FIG. 1, and can be represented by '$r_p$'.

The signal-receiver module 402 can determine the total channel evaluation 410. The total channel evaluation 410 is one or an aggregation of likelihoods, including log-likelihood ratio, calculated for one or more instances of the symbol 120. For example, the total channel evaluation 410 can be a set of LLRs used for determining and identifying one or more instance of the symbol 120 in the receiver message 128. The total channel evaluation 410 can be represented as $L_{ch}$.

The signal-receiver module 402 can use the first control unit 212 of FIG. 2, the second control unit 234 of FIG. 2, the first communication unit 216 of FIG. 2, the second communication unit 236 of FIG. 2, or a combination thereof to determine the symbol vector 408, the total channel evaluation 410, or a combination thereof. The signal-receiver module 402 can store the symbol vector 408, the total channel evaluation 410, or a combination thereof in the first storage unit 214 of FIG. 2, the second storage unit 246 of FIG. 2, or a combination thereof.

After determining the total channel evaluation 410, the symbol vector 408, the initial estimate of the noise variance 130, or a combination thereof, the control flow can pass to the decode module 404. The control flow can pass by having one or more of the determined results pass from the signal-receiver module 402 as an input to the decode module 404, by storing the determined results at a location known and accessible to the decode module 404, by notifying the decode module 404, such as by using a flag, an interrupt, a status signal, or a combination, or a combination of processes thereof. The signal-receiver module 402 can similarly pass the total channel evaluation 410, the symbol vector 408, the initial estimate of the noise variance 130, or a combination thereof to the mismatch module 402.

The decode module 404 is configured to decode the receiver message 128. The decode module 404 can include an initial-set module 418, a remaining-set module 420, a first-mechanism module 422, and a second-mechanism module 424 for decoding the receiver message 128.

The initial-set module 418 is configured to decode a portion of the receiver message 128. The initial-set module 418 can include an initial run threshold 426. The initial run threshold 426 is a limitation on a number of iterations in decoding the receiver message 128. For example, the initial run threshold 426 can limit decoding processes to one, two, or three instances of the full iteration 304 of FIG. 1.

The initial-set module 418 can use the initial run threshold 426 to decode an evaluation portion 428 of the receiver message 128. The evaluation portion 428 is a grouping within the receiver message 128, such as instances of the code-word 112 of FIG. 1 or the segment 116 of FIG. 1, that can be used to estimate, compensate, or a combination thereof in regards to the signal-noise ratio 132 of FIG. 1. For example, the evaluation portion 428 can be the first one, two, or three instances of the code-word 112 in the segment 116 or for the receiver message 128. Portions in the receiver message 128 or segment 116 excluded from the evaluation portion 428 can be a remainder portion 430.

The initial-set module 418 can use the initial run threshold 426 to control the first-mechanism module 422. The initial-set module 418 can control the decoding by passing the initial run threshold 426 to the first-mechanism module 422.

The first-mechanism module 422 can be configured to decode the receiver message 128 up to the initial run threshold 426 using the mismatch-insensitive mechanism 322 of FIG. 3, such as the maximum-probability mechanism 324 of FIG. 3. For example, the first-mechanism module 422 can calculate the first extrinsic value 316 of FIG. 3, the second extrinsic value 334 of FIG. 3, corresponding a-posteriori data, or a combination thereof according to the mismatch-insensitive mechanism 322.

The first-mechanism module 422 can be similar to the decoding module 302 of FIG. 3. The first-mechanism module 422 can be a turbo decoder. The first-mechanism module 422 can calculate various a-priori information, a-posteriori data, extrinsic values, or a combination thereof as described above. The first-mechanism module 422 can further set the initial run threshold 426 as the stop criteria 338 to partially decode the receiver message 128.

The initial-set module 418 can be configured to determine an enhancement a-posteriori ratio 432 based on decoding the evaluation portion 428 of the receiver message 128 using the mismatch-insensitive mechanism 322 limited by the initial run threshold 426. The enhancement a-posteriori ratio 432 is a-posteriori LLR calculated by the first-mechanism module 422. The enhancement a-posteriori ratio 432, represented as $L_{APP,i}$, can be the a-posteriori data generated for the last iteration of decoding the receiver message 128, represented by 'i', as specified by the initial run threshold 426.

The enhancement a-posteriori ratio 432 can include a system component 434, a parity component 436, or a combination thereof. The system component 434, represented as '$L_{s,i}$', is a vector of a-posteriori data corresponding to the systematic portion 113 within the receiver message 128. The parity component 436, represented as '$L_{p,i}$', is a vector of a-posteriori data corresponding to the parity portion 114 within the receiver message 128. Thus, the enhancement a-posteriori ratio 432, which can be further represented as '$[L_{s,i} L_{p,i}]$' can be a concatenation of the LLRs of the systematic portion 113 and the parity portion 114 interleaved and de-multiplexed from multiple decoding components within the first-mechanism module 422.

The initial-set module 418 can determine the enhancement a-posteriori ratio 432 by identifying and storing the a-posteriori data calculated by the first-mechanism module 422 for decoding the evaluation portion 428 of the receiver message 128 corresponding to the initial run threshold 426. The initial-set module 418 can store the enhancement a-posteriori ratio 432 in the first storage unit 214, the second storage unit 246, or a combination thereof. The initial-set module 418 can further store the first extrinsic value 316 of FIG. 3, the second extrinsic value 334 of FIG. 3, or a combination thereof corresponding to the last iteration as specified by the initial run threshold 426 in the first storage unit 214, the second storage unit 246, or a combination thereof.

The decode module 404 can use the second-mechanism module 424, the remaining-set module 420, or a combination thereof to decode the remainder portion 430. Details regarding the remaining-set module 420 and the second-mechanism module 424 will be discussed below.

After determining the enhancement a-posteriori ratio 432, appropriate instances of the first extrinsic value 316, the second extrinsic value 334, the enhanced a-posterior 432 or a combination thereof, the control flow can pass to the mismatch module 406. The control flow can pass in a similar manner as described above from the signal-receiver module 402 to the decode module 404 using the enhancement a-posteriori ratio 432, appropriate instances of the first extrinsic value 316, the second extrinsic value 334, or a combination thereof.

The mismatch module 406 is configured to estimate and compensate for the signal-noise ratio 132. The mismatch module 406 can include a stop module 438, an estimation module 440, and a compensation module 442 to estimate and compensate for a mismatch between actual and estimated instance of the signal-noise ratio 132 for the receiver message 128.

The stop module 438 is configured to check for a stopping condition. For example, the stop module 438 can stop the signal processing as successfully processing the receiver message 128 when the results from the decode module 404, the signal-receiver module 402, or a combination thereof satisfies an error check, such as CRC or checksum, using the parity portion 114. Also for example, the stop module 438 can stop the decoding when the stopping condition of overall iteration count, error metric, or a combination thereof have been satisfied.

The estimation module 440 is configured to estimate the mismatch between the actual and the estimated instance of the signal-noise ratio 132 for the receiver message 128. The estimation module 440 can estimate the mismatch based on the enhancement a-posteriori ratio 432.

The estimation module 440 can estimate the mismatch by estimating the signal-noise ratio 132 using the enhancement a-posteriori ratio 432. The estimation module 440 can estimate the signal-noise ratio 132 by performing hard-decisions according to the hard-decision mechanism 412 using the enhancement a-posteriori ratio 432. The estimation module 440 can perform hard-decision by identifying the symbol 120 based on the enhancement a-posteriori ratio 432.

For example, the estimation module 440 can perform the hard-decision using only the system component 434 of the enhancement a-posteriori ratio 432 and without using the parity component 436, re-modulating the results to estimate the symbol 120 in the transmitter message 122 of FIG. 1. The estimation for the symbol 120 in the transmitter message 122 can be represented as:

$$\hat{y}_{s,i} = \text{MOD}(HD(L_{s,i})). \quad \text{Equation (7).}$$

The estimation for the symbol can done using hard-decisions on the system component 434 of the enhancement a-posteriori ratio 432 only, the parity component 436 of the enhancement a-posteriori ratio 432 only, portions therein, or a combination thereof.

Also for example, when the communication system 100 is an LTE system using the modulation scheme 118 of QPSK, 4-QAM, or 64-QAM, the estimation module 440 can perform the hard-decision using only the system component 434 without re-encoding the symbol 120 using the channel code. It has been discovered that estimating the signal-noise ratio 132 without re-encoding provides simpler complexity and lower error rates.

The estimation module 440 can estimate the noise variance 130. The estimation module 440 can estimate the noise variance 130 using result of the hard-decision, such as remodulated instance of the symbol or the signal-noise ratio 132. The estimation module 440 can further use the symbol vector 408 or a portion therein, such as the systematic vector 414.

For example, the estimation module 440 can estimate the noise variance 130 after 'i' iterations according to the initial run threshold 426, represented as $\tilde{\sigma}_{n,i}^2$, using:

$$\tilde{\sigma}_{n,i}^2 = \frac{\|r_s - a_s \hat{y}_{s,i}\|^2}{2B_s}. \quad \text{Equation (8).}$$

The term '$a_s$' can represent a vector of channel gains for transmitted systematic symbols, and '$B_s$' can represent a block length of systematic symbols.

The estimation module 440 can estimate the mismatch between the actual and the estimated instance of the signal-noise ratio 132 by calculating a mismatch estimation 444. The mismatch estimation 444 is a calculated estimation of a difference between actual instance of the signal-noise ratio 132 and an initial instance of estimated instance of the signal-noise ratio 132.

The communication system 100 can initially represent the mismatch estimation 444 as:

$$\tilde{Y}_m = \frac{\sigma_n^2}{\tilde{\sigma}_{n,0}^2}. \quad \text{Equation (9).}$$

The term '$\sigma_n^2$' can represent the actual instance of the noise variance 130.

The estimation module 440 can use the first control unit 212, the second control unit 234, or a combination thereof to calculate the mismatch estimation 444. The estimation module 440 can use the functional units to calculate the mismatch estimation 444 with the initial instance of the noise variance 130 from the signal-receiver module 402 '$N_0$', previous instance of the estimated instance of the noise variance 130, the current estimation of the noise variance 130 after 'i' iterations, or a combination thereof to calculate the mismatch estimation 444. The estimation module 440 can calculate the mismatch estimation 444 using:

$$\tilde{Y}_{m,i} = \frac{\tilde{\sigma}_{n,i}^2}{\tilde{\sigma}_{n,i-1}^2}. \quad \text{Equation (10).}$$

Also for example, the estimation module 440 can estimate the mismatch between the actual and the estimated instance of the signal-noise ratio 132 by calculating the mismatch estimation 444 as a calculated estimation of the ratio of channel evaluation 410, or the compensation channel value 446, and the desired channel evaluation that is consistent with the definition of log likelihood ratios. The consistent channel evaluation can be calculated by the natural logarithm of the ratio of two values by the same probability distribution function of the channel evaluation 410 or compensation channel value 446, conditioned on transmitted bit is "1" or "0", calculated at two different points with the same magnitudes of the channel evaluation but with different signs.

The estimation module 440 calculate the mismatch estimation 444 using:

$$\tilde{Y}_{m,i} = \frac{L_{ch,i-1}}{\ln \frac{p_1(L_{ch,i-1})}{p_1(-L_{ch,i-1})}} \quad \text{Equation (11).}$$

or $$\tilde{Y}_{m,i} = \frac{L_{ch,i-1}}{\ln \frac{p_0(-L_{ch,i-1})}{p_0(L_{ch,i-1})}}.$$

The estimation module 440 can estimate the probability density function by performing histogram calculation using channel evaluation 410 or compensation channel value 446, and the hard decision according to the hard decision mechanism 412 using the enhancement a-posteriori ratio 432.

The compensation module 442 is configured to compensate for the mismatch in actual and estimated instances of the signal-noise ratio 132. The compensation module 442 can compensate for the mismatch by determining a compensation channel value 446 and a compensation extrinsic data 448 using the mismatch estimation 444.

The compensation channel value 446 is one instance or an aggregation of likelihoods, including log-likelihood ratio, calculated for one or more instances of the symbol 120 and adjusted for the mismatch in the signal-noise ratio 132. The compensation channel value 446 can be based on previous or initial instances of the total channel evaluation 410 and the mismatch estimation 444. The compensation channel value 446 can be expressed as:

$$L'_{ch,i} = \frac{L_{ch,i-1}}{\tilde{Y}_{m,i}}. \qquad \text{Equation (12)}.$$

For example, the compensation module 442 can calculate the compensation channel value 446 by setting $L'_{ch,0}$ to the total channel evaluation 410, $L_{ch}$, from the signal-receiver module 402 and scaling by the mismatch estimation 444. Also for example, the compensation module 442 can calculate the compensation channel value 446 for a current iteration by scaling the compensation channel value 446 for a previous iteration with the mismatch estimation 444 for the current iteration.

The compensation extrinsic data 448 is one or more instance of calculated extrinsic values adjusted for the mismatch in the signal-noise ratio 132. The compensation extrinsic data 448 can be the first extrinsic value 316, the second extrinsic value 334, or a combination thereof, expressed as '$L_{e,i}$', from the first-mechanism module 422 scaled by the mismatch estimation 444. The compensation extrinsic data 448 can be expressed as:

$$L'_{e,i} = \frac{L_{e,i}}{\tilde{Y}_{m,i}}. \qquad \text{Equation (13)}.$$

The compensation module 442 can use the first control interface 222 of FIG. 2, the second control interface 244 of FIG. 2, the first storage interface 224 of FIG. 2, the second storage interface 246 of FIG. 2, or a combination thereof to access stored instances of the total channel evaluation 410, previous instances of the compensation channel value 446, the various extrinsic values, or a combination thereof. The compensation module 442 can use the first control unit 212, the second control unit 234, the first communication unit 216, the second communication unit 236, or a combination thereof to calculate the compensation channel value 446, the compensation extrinsic data 448, or a combination thereof.

After calculating the compensation channel value 446, the compensation extrinsic data 448, or a combination thereof, the control flow can pass to the decode module 404. The control flow can pass in a similar manner as described above from the signal-receiver module 402 to the decode module 404 using the compensation channel value 446, the compensation extrinsic data 448, or a combination thereof.

The decode module 404 can be configured to decode the remainder portion 430. The decode module 404 can include the remaining-set module 420 and the second-mechanism module 424 for decoding the remainder portion 430.

The remaining-set module 420 is configured to decode the remainder portion 430 using the mismatch-sensitive mechanism 318 of FIG. 3, such as the logarithmic-probability mechanism 320 of FIG. 3. The remaining-set module 420 can decode the remainder portion 430 by controlling the first-mechanism module 422, the second-mechanism module 424, or a combination thereof according to the logarithmic-probability mechanism 320.

For example, the first-mechanism module 422 and the second-mechanism module 424 can be arranged in a serial configuration. For the serial configuration, the remaining-set module 420 can control the second-mechanism module 424 to determine the decoder-selection adjustment 326 of FIG. 3 and control the first-mechanism module 422 for calculation of all extrinsic values. The second-mechanism module 424 can be configured to determine the decoder-selection adjustment 326 for adjusting between a logarithmic-probability mechanism 320 and a maximum-probability mechanism 324.

Continuing with the example, the remaining-set module 420 can control the first-mechanism module 422 to calculate the first extrinsic value 316, the second extrinsic value 334, or a combination thereof using the maximum-probability mechanism 324, with or without the decoder-output adjustment 336. The remaining-set module 420 can adjust the calculated instances of the first extrinsic value 316, the second extrinsic value 334, or a combination thereof with the decoder-selection adjustment 326 according to the logarithmic-probability mechanism 320.

Continuing with the example, the remaining-set module 420 can alternatively control the first-mechanism module 422 by passing the decoder-selection adjustment 326 to the first-mechanism module 422. The first-mechanism module 422 can use the decoder-selection adjustment 326 to calculate the first extrinsic value 316, the second extrinsic value 334, or a combination thereof according to the logarithmic-probability mechanism 320.

Also for example, the first-mechanism module 422 and the second-mechanism module 424 can be arranged in a parallel configuration. For the parallel configuration, the first-mechanism module 422 can be configured to use the maximum-probability mechanism 324 and process the evaluation portion 428. The second-mechanism module 424 can be configured to decode the remainder portion 430 using the decoder-selection adjustment 326 according to the logarithmic-probability mechanism 320.

The decode module 404 can further use the compensation channel value 446, the compensation extrinsic data 448, or a combination thereof to decode the remainder portion 430. The remaining-set module 420 can use the first control unit 212, the second control unit 234, the first communication unit 216, the second communication unit 236, or a combination thereof to control the first-mechanism module 422, the second-mechanism module 424, or a combination thereof to use the compensation channel value 446, the compensation extrinsic data 448, or a combination thereof.

For example, the first-mechanism module 422, the second-mechanism module 424, or a combination thereof can use the compensation channel value 446 instead of the total channel evaluation 410, the estimation of the channel quality 124, or a combination thereof. Also for example, the first-mechanism module 422, the second-mechanism module 424, or a combination thereof can use the compensation extrinsic data 448 as the first a-priori information 314, the second a-priori information 332, or a combination thereof.

It has been discovered that first decoding the evaluation portion 428 limited by the initial run threshold 426 using the mismatch-insensitive mechanism 322 and decoding the remainder portion 430 using the mismatch-sensitive mechanism 318 provides lower error rates. The use of the mismatch-insensitive mechanism 322 first using the initial run threshold 426 and using the results thereof to utilize the mismatch-sensitive mechanism 318 can eliminate the effect of mismatch in actual and estimated instances of the signal-noise ratio 132 while maintaining accuracy gains provided by the mismatch-sensitive mechanism 318.

It has also been discovered that the mismatch estimation 444, the compensation channel value 446, and the compensation extrinsic data 448 provide increased stability without increase in the complexity. The mismatch estimation 444, the compensation channel value 446, and the compensation extrinsic data 448 provide increased stability without increase in the complexity by estimating the mismatch between the estimated and the actual instances of the signal-noise ratio 132, which can be used to compensate calculations and processing to improve accuracy.

It has further been discovered that the mismatch estimation 444, the compensation channel value 446, and the compensation extrinsic data 448 provide processing efficiency. The mismatch estimation 444, the compensation channel value 446, and the compensation extrinsic data 448 provide processing efficiency by providing a method for combining and utilizing both the mismatch-sensitive mechanism 318 and the mismatch-insensitive mechanism 322, and using the result of one mechanism in the other mechanism.

The decode module 404 can be further configured to update the mismatch estimation 444, the compensation channel value 446, and the compensation extrinsic data 448 based on decoding the remainder portion 430 limited by a further run threshold 450. The further run threshold 450 is a further limitation on a number of iterations in decoding the receiver message 128. The further run threshold 450 can be greater than or equal to the initial run threshold 426.

The decode module 404 can decode the remainder portion 430 until the further run threshold 450. The decode module 404 can update the mismatch estimation 444, the compensation channel value 446, and the compensation extrinsic data 448 by passing the results of the decoding to the mismatch module 406. The mismatch module 406 can use the results of the decoding module 302 to recalculate the mismatch estimation 444, the compensation channel value 446, and the compensation extrinsic data 448. The updated values can be passed back to the decode module 404 to continue decoding the remainder portion 430 of the receiver message 128.

It has been discovered that the feedback loop between the decode module 404 and the mismatch module 406 for updating the mismatch estimation 444, the compensation channel value 446, and the compensation extrinsic data 448 using the further run threshold 450 provides reduced hardware requirement. The reduced hardware requirement can result from integrating the feedback loop with the mismatch estimation 444, the compensation channel value 446, and the compensation extrinsic data 448 with other systems or functions, such as the signal-receiver module 402 iteratively integrated with decoding modules or channel estimation function.

The communication system 100 has been described with module functions or order as an example. The communication system 100 can partition the modules differently or order the modules differently. For example, functions of the initial-set module 418 and the first-mechanism module 422 can be combined, or functions of the signal-receiver module 402, the decode module 404, the mismatch module 406, or a combination thereof can be iteratively interleaved together.

The modules described in this application can be hardware implementation or hardware accelerators, including passive circuitry, active circuitry, or both, in the first control unit 216 or in the second control unit 238. The modules can also be hardware implementation or hardware accelerators, including passive circuitry, active circuitry, or both, within the first device 102 of FIG. 1 or the second device 106 of FIG. 1 but outside of the first control unit 216 or the second control unit 238, respectively.

The physical transformation from the mismatch estimation 444, the compensation channel value 446, and the compensation extrinsic data 448 results in the movement in the physical world, such as content displayed or recreated for the user on the mobile device 102. The content, such as navigation information or voice signal of a caller, recreated on the first device 102 can influence the user's movement, such as following the navigation information or replying back to the caller. Movement in the physical world results in changes to the mismatch estimation 444, the compensation channel value 446, and the compensation extrinsic data 448 by compensating for the effects of the SNR mismatch.

Figure 5:
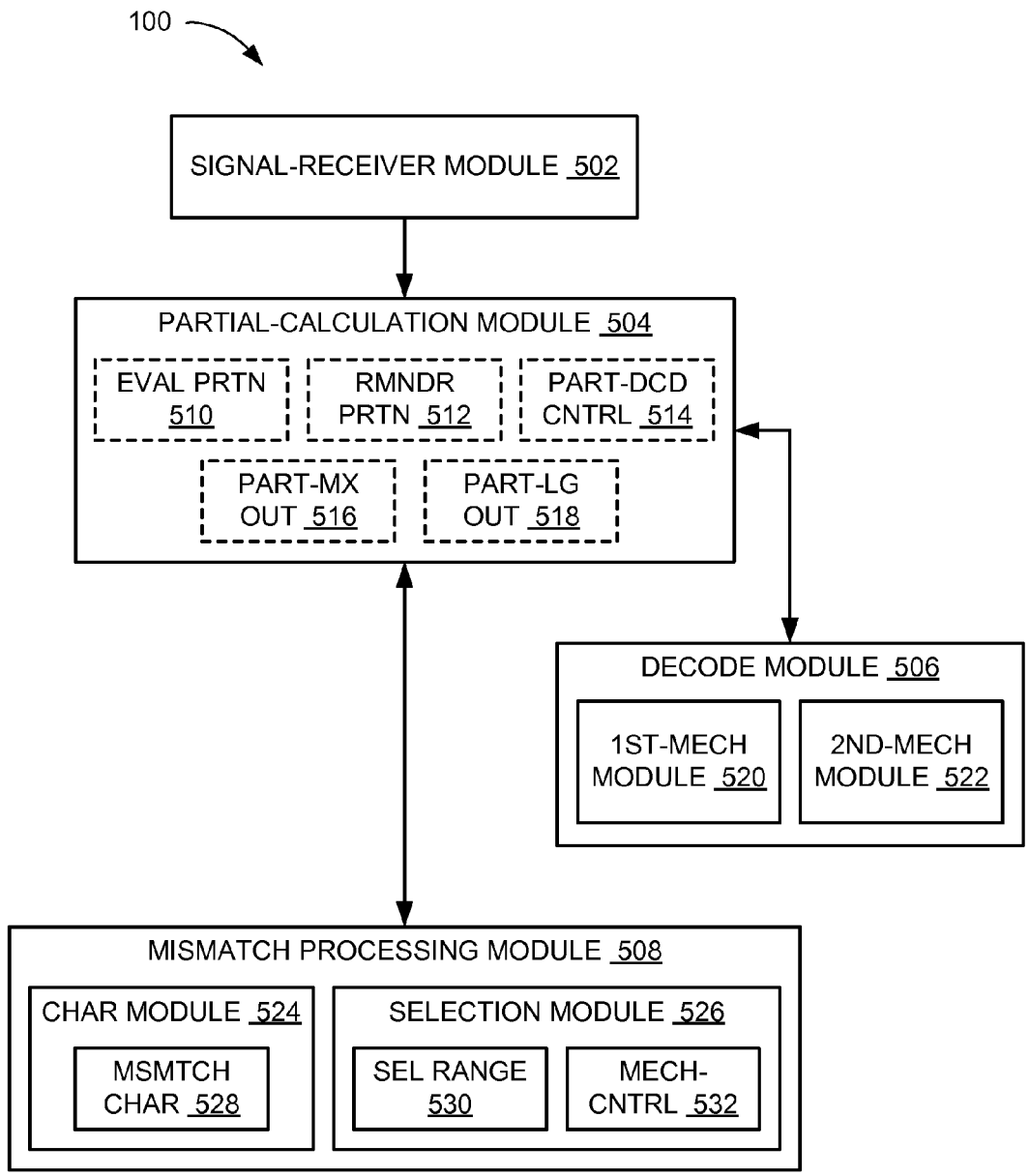
FIG. 5 is a further control flow of the communication system.

Referring now to FIG. 5, therein is shown a further control flow of the communication system 100. The communication system 100 can include a signal-receiver module 502, a partial-calculation module 504, a decode module 506, and a mismatch processing module 508.

The signal-receiver module 502 can be coupled to the partial-calculation module 504. For example, one or more outputs of the signal-receiver module 502 can be connected to one or more inputs of the partial-calculation module 504, one or more inputs of the signal-receiver module 502 can be connected to one or more outputs of the partial-calculation module 504, or a combination thereof. Similarly, the partial-calculation module 504 can be coupled to the decode module 506, the mismatch processing module 508, or a combination thereof.

The signal-receiver module 502 is configured to detect, demodulate, or a combination thereof for the receiver message 128 of FIG. 1. The signal-receiver module 502 can detect signals and variations in frequency, magnitude, phase, signal shape, timing, or a combination thereof. The signal-receiver module 502 can demodulate by extracting original information, such as the symbol 120 of FIG. 1 from a carrier frequency used to transmit the transmitter message 122 of FIG. 1 through the channel 108 of FIG. 1.

The signal-receiver module 502 can analyze the individual symbols within the receiver message 128. The signal-receiver module 502 can analyze the individual symbols transmitted and received using various sender-receiver combinations, such as single-input single-output (SISO) or multiple-input multiple-output (MIMO) configurations.

The signal-receiver module 502 can use various implementations. For example, the signal-receiver module 502 can be a maximum-likelihood detector, a linear estimator, such as minimum mean square error estimator or a zero-forcing estimator, or an interference-cancelling detector. The signal-receiver module 502 can also be a non-interference cancelling detector.

The signal-receiver module 502 can calculate likelihoods, ratios, logarithmic derivations thereof, or a combination thereof for symbol level information regarding the receiver message 128. The signal-receiver module 502 can also estimate the channel quality 124 of FIG. 1, the signal-noise ratio 132 of FIG. 1, or a combination thereof.

After detecting, demodulating, or a combination thereof for the receiver message 128, the control flow can pass to the partial-calculation module 504. The control flow can pass by having the receiver message 128 pass from the signal-receiver module 502 as an input to the partial-calculation module 504, by storing the receiver message 128 at a location known and accessible to the partial-calculation module 504, by notifying the partial-calculation module 504, such as by using a flag, an interrupt, a status signal, or a combination, or a combination of processes thereof.

The partial-calculation module 504 is configured to control initial analysis of the receiver message 128 for testing an accuracy or mismatch for the signal-noise ratio 132. The partial-calculation module 504 can be configured to control decoding processes based on the half iteration 306 of FIG. 3, the full iteration 304 of FIG. 3, or a combination thereof. The partial-calculation module 504 can be configured to control execution of decoding processes including both the mismatch-sensitive mechanism 318 of FIG. 3 and the mismatch-insensitive mechanism 322 of FIG. 3, such as the logarithmic-probability mechanism 320 of FIG. 3 and the maximum-probability mechanism 324 of FIG. 3.

The partial-calculation module 504 can determine an evaluation portion 510. The evaluation portion 510 is a grouping within the code-word 112 of FIG. 1 or the receiver message 128 that can be used to perform the accuracy or mismatch testing in regards to the signal-noise ratio 132. For example, the evaluation portion 510 can be an initial portion of the code-word 112 corresponding to the half iteration 306. Also for example, the evaluation portion 510 can be initial one or two instances of the code-word 112 within the segment 116 of FIG. 1, the receiver message 128, or a combination thereof.

The receiver message 128, the segment 116, the code-word 112, or a combination thereof can be thusly be divided into the evaluation portion 510 and a remainder portion 512. The remainder portion 512 can include portions of the code-word 112, the segment 116, the receiver message 128, or a combination thereof excluded by the evaluation portion 510.

The partial-calculation module 504 can determine a partial-decode controller 514 based on the evaluation portion 510. The partial-decode controller 514 is a condition or a limitation for decoding the receiver message 128 for testing the accuracy or mismatch of the signal-noise ratio 132. The partial-decode controller 514 can be used to limit an iteration count for decoding the evaluation portion 510. The partial-decode controller 514 can be used to limit the iteration count to be less than the block size 134 of FIG. 1 or less than a length of the code-word 112.

For example, the partial-decode controller 514 can include the half iteration 306, the full iteration 304, or a combination thereof. For a more specific example, the partial-decode controller 514 can be used as the stop criteria 338 of FIG. 3 to limit the decoding process to one instance of the half iteration 306, two instances of the full iteration 304, or any increment there-between.

The partial-calculation module 504 can use the first control unit 212 of FIG. 2, the second control unit 234 of FIG. 2, the first communication unit 216 of FIG. 2, the second communication unit 236 of FIG. 2, or a combination thereof to determine the partial-decode controller 514. The partial-calculation module 504 can store the partial-decode controller 514 in the first storage unit 214 of FIG. 2, the second storage unit 246 of FIG. 2, or a combination thereof.

After determining the partial-decode controller 514, the control flow can pass to the decode module 506. The control flow can pass by having the partial-decode controller 514 pass from the partial-calculation module 504 as an input to the decode module 506, by storing the partial-decode controller 514 at a location known and accessible to the decode module 506, by notifying the decode module 506, such as by using a flag, an interrupt, a status signal, or a combination, or a combination of processes thereof.

The decode module 506 is configured to decode the receiver message 128. The decode module 506 can be configured to decode the receiver message 128 for testing the accuracy or mismatch of the signal-noise ratio 132 by calculating a partial-insensitive output 516 and a partial-sensitive output 518 using the partial-decode controller 514.

The partial-insensitive output 516 is a value based on the first extrinsic value 316 of FIG. 3, the second extrinsic value 334 of FIG. 3, or a combination thereof resulting from partially decoding the receiver message 128 using the mismatch-insensitive mechanism 322, such as the maximum-probability mechanism 324. For example, the partial-insensitive output 516 can be a statistical mean of the absolute value of the first extrinsic value 316, the second extrinsic value 334, or a combination thereof representing LLR values. The partial-insensitive output 516 can be represented as $E\{|L_{e(MLM)}|\}$.

The partial-sensitive output 518 is a value based on the first extrinsic value 316, the second extrinsic value 334, or a combination thereof resulting from partially decoding the receiver message 128 using the mismatch-sensitive mechanism 318, such as the logarithmic-probability mechanism 320. For example, the partial-sensitive output 518 can be a statistical mean of the absolute value of the first extrinsic value 316, the second extrinsic value 334, or a combination thereof representing LLR values. The partial-sensitive output 518 can be represented as $E\{|L_{e(LM)}|\}$.

The decode module 506 can include a first-mechanism module 520 and a second-mechanism module 522 for calculating the partial-sensitive output 518, the partial-insensitive output 516, or a combination thereof to decode the receiver message 128. The decode module 506 can process the receiver message 128 in a variety of ways. For example, the decode module 506 can have the first-mechanism module 520 and the second-mechanism module 522 in a parallel configuration or a serial configuration.

As a more specific example for the parallel configuration, the first-mechanism module 520 and the second-mechanism module 522 can each be similar to the decoding module 302 of FIG. 3. The first-mechanism module 520 can be configured to calculate the extrinsic values corresponding to the partial-insensitive output 516 using the maximum-probability mechanism 324. The extrinsic output values can be adjusted using the decoder-output adjustment 336.

Continuing with the example, the second-mechanism module 522 can be configured to calculate the extrinsic values corresponding to the partial-sensitive output 518 using the logarithmic-probability mechanism 320. The second-mechanism module 522 can be configured to determine the decoder-selection adjustment 326 of FIG. 3 and calculate the extrinsic values using the decoder-selection adjustment 326.

Continuing with the example, the second-mechanism module 522 can run simultaneously with the first-mechanism module 520 in the parallel configuration. The first-mechanism module 520 and the second-mechanism module 522 can each use the partial-decode controller 514 as the stop criteria 338 and only partially decode the receiver message 128, such as for one instance of the half iteration 306 or two instances of the full iteration 304.

As a more specific example for the serial configuration, the first-mechanism module 520 can be similar to the decoding module 302. The first-mechanism module 520 can be configured to calculate the extrinsic values corresponding to both the partial-insensitive output 516 and the partial-sensitive output 518 using both the maximum-probability mechanism 324 and the logarithmic-probability mechanism 320. The second-mechanism module 522 can determine the decoder-selection adjustment 326 for adjusting between the logarithmic-probability mechanism 320 and the maximum-probability mechanism 324 using the adjustment set 328.

Continuing with the example, the first-mechanism module 520 can calculate the extrinsic values corresponding to the partial-insensitive output 516 using the maximum-probability mechanism 324. The first-mechanism module 520 can repeat the calculation process using the logarithmic-probability mechanism 320 and the decoder-selection adjustment 326 from the second-mechanism module 522 to calculate the extrinsic values corresponding to the partial-sensitive output 518. The first-mechanism module 520 can also calculate a second set of values during the initial calculation process by adjusting the extrinsic values corresponding to the partial-insensitive output 516 with the decoder-selection adjustment 326.

Continuing with the example, the first-mechanism module 520 can use the partial-decode controller 514 to generate two sets of extrinsic values, one corresponding to the maximum-probability mechanism 324 and the other corresponding to logarithmic-probability mechanism 320. The serial configuration can similarly be limited by the partial-decode controller 514 for partially processing the receiver message 128, such as for one instance of the half iteration 306 or one instance of the full iteration 304.

After partially decoding the receiver message 128 by calculating extrinsic values, the control flow can pass back to the partial-calculation module 504. The control flow can pass by having the first extrinsic value 316, the second extrinsic value 334, or a combination thereof pass from the decode module 506 as an input to the partial-calculation module 504, by storing the first extrinsic value 316, the second extrinsic value 334, or a combination thereof at a location known and accessible to the decode module 506, by notifying the partial-calculation module 504, such as by using a flag, an interrupt, a status signal, or a combination, or a combination of processes thereof.

The partial-calculation module 504 can be configured to determine the partial-sensitive output 518 and the partial-insensitive output 516 for the receiver message 128 or a portion therein. The partial-calculation module 504 can determine the partial-sensitive output 518 and the partial-insensitive output 516 by processing the various instances of the extrinsic values calculated by the decode module 506 using the partial-decode controller 514 to limit decoding iterations to be less than the block size 134, size of the code-word 112, or a combination thereof.

For example, the partial-calculation module 504 can determine the partial-sensitive output 518 by processing the first extrinsic value 316, the second extrinsic value 334, or a combination thereof calculated using the logarithmic-probability mechanism 320. The partial-calculation module 504 can combine and scale the extrinsic LLR values to calculate a mean of the extrinsic LLR values resulting from the logarithmic-probability mechanism 320. The partial-calculation module 504 can assign the mean value to the partial-sensitive output 518.

Also for example, the partial-calculation module 504 can determine the partial-insensitive output 516 by processing the first extrinsic value 316, the second extrinsic value 334, or a combination thereof calculated using the maximum-probability mechanism 324. The partial-calculation module 504 can combine and scale the extrinsic LLR values to calculate a mean of the extrinsic LLR values resulting from the maximum-probability mechanism 324. The partial-calculation module 504 can assign the mean value to the partial-insensitive output 516.

The partial-calculation module 504 can access the extrinsic values using the first control interface 222 of FIG. 2, the first storage interface 224 of FIG. 2, the second control interface 244 of FIG. 2, the second control interface 244 of FIG. 2, or a combination thereof. The partial-calculation module 504 can determine the partial-sensitive output 518 and the partial-insensitive output 516 using the first control unit 212, the second control unit 234, the first communication unit 216, the second communication unit 236, or a combination thereof. The partial-calculation module 504 can store the partial-sensitive output 518 and the partial-insensitive output 516 in the first storage unit 214, the second storage unit 246, or a combination thereof.

After determining the partial-sensitive output 518, the partial-insensitive output 516, or a combination thereof, the control flow can pass to the mismatch processing module 508. The control flow can pass by having the partial-sensitive output 518, the partial-insensitive output 516, or a combination thereof pass from the partial-calculation module 504 as an input to the mismatch processing module 508, by storing the partial-sensitive output 518, the partial-insensitive output 516, or a combination thereof at a location known and accessible to the mismatch processing module 508, by notifying the mismatch processing module 508, such as by using a flag, an interrupt, a status signal, or a combination, or a combination of processes thereof.

The mismatch processing module 508 is configured to select a scheme for decoding the receiver message 128. The mismatch processing module 508 can include a characterization module 524 and a selection module 526 for selecting the decoding scheme.

The characterization module 524 is configured to calculate a mismatch characterization 528 using the partial-sensitive output 518 and the partial-insensitive output 516. The mismatch characterization 528 is an indication or a measure regarding the signal-noise ratio 132. The mismatch characterization can characterize mismatch between an actual instance of the signal-noise ratio 132 and an estimation of the signal-noise ratio 132.

The mismatch characterization 528 can be a ratio between the partial-sensitive output 518 and the partial-insensitive output 516. The mismatch characterization 528 can be represented by:

$$r = \frac{E\{|L_{e(LM)}|\}}{E\{|L_{e(MLM)}|\}}$$

Equation (14).

The mismatch characterization 528 can also include an approximation of the SNR mismatch as deployed by the mismatch estimation module 440. The characterization module 524 can use expectation and maximization scheme on the received LLRs to estimate the variance of the distribution of the LLR values. The calculated result can be used to estimate the value of the mismatch from the estimated instance of the signal-noise ratio 132 and the actual instance of the signal-noise ratio 132.

It has been discovered that the mismatch characterization 528, the partial-insensitive output 516, and the partial-sensitive output 518 provide lower complexity and required resources for characterizing an SNR mismatch. The mismatch characterization 528 determined using the partial-insensitive output 516 and the partial-sensitive output 518 represented by Equation (14) has a monotonic relationship with the SNR mismatch, which can be used to characterize the SNR mismatch using extrinsic values initially required for decoding the receiver message 128.

It has further been discovered that the mismatch characterization 528, the logarithmic-probability mechanism 320, and the maximum-probability mechanism 324 provide lower error rates. The mismatch characterization 528, the logarithmic-probability mechanism 320, and the maximum-probability mechanism 324 can provide lower error rates by characterizing the SNR mismatch and decoding the receiver message 128 with appropriate mechanism without any prior knowledge of the actual instance of the signal-noise ratio 132.

The characterization module 524 can use the first control unit 212, the second control unit 234, the first communication unit 216, the second communication unit 236, or a combination thereof to determine the mismatch characterization 528 using the partial-sensitive output 518 and the partial-insensitive output 516. The characterization module 524 can access the partial-sensitive output 518 and the partial-insensitive output 516 using the first control interface 222, the second control interface 244, the first storage interface 224, the second storage interface 246, the first communication interface 228 of FIG. 2, the second communication interface 250 of FIG. 2, or a combination thereof.

The selection module 526 is configured to generate a mechanism-controller 532. The mechanism-controller 532 is a selection, such as a value or a switch setting specifying a choice, designating a mechanism for decoding the receiver message 128. For example, the mechanism-controller 532 can specify the mismatch-sensitive mechanism 318, such as the logarithmic-probability mechanism 320, the mismatch-insensitive mechanism 322, such as the maximum-probability mechanism 324, or any other mechanism available for the communication system 100.

The selection module 526 can generate the mechanism-controller 532 based on the mismatch characterization 528 and a selection range 530. The selection range 530 is a threshold range for selecting the decoding mechanism. The selection range 530 can specify a specific mechanism for decoding the receiver message 128 based on a characterization of the SNR mismatch.

For example, the selection range 530 can designate the mismatch-sensitive mechanism 318 when the mismatch characterization 528 indicates the SNR mismatch to be between −1 dB and 1.5 dB. The selection range 530 can designate the mismatch-insensitive mechanism 322 when the mismatch characterization 528 indicates the SNR mismatch to be outside of a range between −1 dB and 1.5 dB. The selection range 530 can be predetermined by the communication system 100 and can be based on other environmental conditions, such as the channel 108 or a device signature for the first device.

The selection module 526 can generate the mechanism-controller 532 based on comparing the mismatch characterization 528 to the selection range 530 for selecting the mismatch-sensitive mechanism 318, such as the logarithmic-probability mechanism 320, the mismatch-insensitive mechanism 322, such as the maximum-probability mechanism 324, or any other available decoding mechanism. For example, the selection module 526 can generate the mechanism-controller 532 to specify the logarithmic-probability mechanism 320 when the mismatch characterization 528 is within the selection range 530, or otherwise specify the maximum-probability mechanism 324.

It has been discovered that the mismatch characterization 528, the selection range 530, and the mechanism-controller 532 provide lower error rates. The mismatch characterization 528, the selection range 530, and the mechanism-controller 532 can provide lower error rates by selecting the decoding mechanism that corresponds to having lower error rates given current amount of the SNR mismatch.

The selection module 526 can use the first control unit 212, the second control unit 234, the first communication unit 216, the second communication unit 236, or a combination thereof to generate the mechanism-controller 532. The selection module 526 can store the mechanism-controller 532 using the first storage unit 214, the second storage unit 246, or a combination thereof.

After calculating the mismatch characterization 528 and generating the mechanism-controller 532, the control flow can pass to the partial-calculation module 504. The control flow can pass similar to the manner described above between the partial-calculation module 504 and the mismatch processing module 508 using the mismatch characterization 528 and the mechanism-controller 532.

The partial-calculation module 504 can be configured to control the decoding of the receiver message 128 using the mechanism-controller 532. For example, the partial-calculation module 504 can be configured to control the decode module 506 for decoding the receiver message 128 or a portion therein. For a specific example, the partial-calculation module 504 can pass the remainder portion 512, extrinsic value from decoding the evaluation portion 510, the mechanism-controller 532, or a combination thereof to the decode module 506 and specify using only the mechanism selected by the mechanism-controller 532 to decode the remainder portion 512.

Continuing with the example, the partial-calculation module 504 can decode the receiver message 128 by combining the results from decoding the remainder portion 512 with the stored results, such as the extrinsic values or error check values, from decoding the evaluation portion 510.

The partial-calculation module 504 can be configured to control the decoding of the receiver message 128 using the mechanism-controller 532 based on the configuration of the decode module 506. The decode module 506 can have the parallel or the serial configuration as described above.

For example, for the parallel configuration, the partial-calculation module 504, the decode module 506, or a combination thereof can select the second-mechanism module 522, configured to calculate the partial-sensitive output 518 for implementing the logarithmic-probability mechanism 320, based on the mechanism-controller 532. The partial-calculation module 504, the decode module 506, or a combination thereof can further select the first-mechanism module 520, configured to calculate the partial-insensitive output 516 for implementing the maximum-probability mechanism 324, for decoding the remainder portion 512 based on the mechanism-controller 532.

Also for example, for the serial configuration, the partial-calculation module 504, the decode module 506, or a combination thereof can select the second-mechanism module 522 to determine the decoder-selection adjustment 326 for decoding the remainder portion 512 of the receiver message 128 when the mechanism-controller 532 indicates logarithmic-probability mechanism 320. The first-mechanism module 520 can be selected to implement the logarithmic-probability mechanism 320 using the decoder-selection adjustment 326. The first-mechanism module 520 can also be selected to implement the maximum-probability mechanism 324 without accessing or interacting with the second-mechanism module 522.

Continuing with the example, for the serial configuration, the first-mechanism module 520 can be configured to decode the remainder portion 512 using either the maximum-probability mechanism 324 or the logarithmic-probability mechanism 320 through the decoder-selection adjustment 326 based on the mechanism-controller 532. The second-mechanism module 522 can be configured to determine the decoder-selection adjustment 326 for adjusting between the logarithmic-probability mechanism 320 and the maximum-probability mechanism 324.

It has been discovered that the partial-sensitive output 518 and the partial-insensitive output 516 determined with the partial-decode controller 514 corresponding to the half iteration 306 provide decreased error rate while maintaining or reducing the processing burden. The testing of the SNR mismatch for partial iterations allows using smaller portions of the receiver message 128 to determine appropriate mechanism and processing remainder portions using the appropriate mechanism. Further, the processing burden can be reduced by storing the test results and combining with the processed results of the test results.

It has further been discovered that the partial-sensitive output 518 and the partial-insensitive output 516 determined with the partial-decode controller 514 corresponding to the half iteration 306 provide real-time flexibility in decoding the receiver message 128. The partial-sensitive output 518 and the partial-insensitive output 516 determined with the partial-decode controller 514 allows the communication system 100 to switch between MLM and Log-MAP mechanisms between packets, without having to wait until end of each iteration.

Further, the decode module 506 can be configured to determine and utilize the decoder-output adjustment 336 only for decoding the remainder portion 512 and not for the evaluation portion 510. The partial-calculation module 504 can control the decode module 506 by setting the stop criteria 338, such as satisfaction of CRC check, a check on the ratio of sign changes from hard-decisions on the total LLRs of the systematic bits from consecutive iterations, or based on the minimum absolute value of the output LLRs.

The communication system 100 has been described with module functions or order as an example. The communication system 100 can partition the modules differently or order the modules differently. For example, functions of the partial-calculation module 504 and the decode module 506 can be combined, or functions of the signal-receiver module 502 can be iteratively interleaved and rearranged with the partial-calculation module 504, the decode module 506, the mismatch processing module 508, or a combination thereof.

The modules described in this application can be hardware implementation or hardware accelerators, including passive circuitry, active circuitry, or both, in the first control unit 216 or in the second control unit 238. The modules can also be hardware implementation or hardware accelerators, including passive circuitry, active circuitry, or both, within the first device 102 of FIG. 1 or the second device 106 of FIG. 1 but outside of the first control unit 216 or the second control unit 238, respectively.

The physical transformation from the mismatch characterization 528 and the mechanism-controller 532 results in movement in the physical world, such as content displayed or recreated for the user on the mobile device 102. The content, such as navigation information or voice signal of a caller, recreated on the first device 102 can influence the user's movement, such as following the navigation information or replying back to the caller. Movement in the physical world results in changes to the mismatch characterization 528 and the mechanism-controller 532 by determining appropriate decoding scheme based on the updated movement or activity influencing the SNR mismatch.

Figure 6:
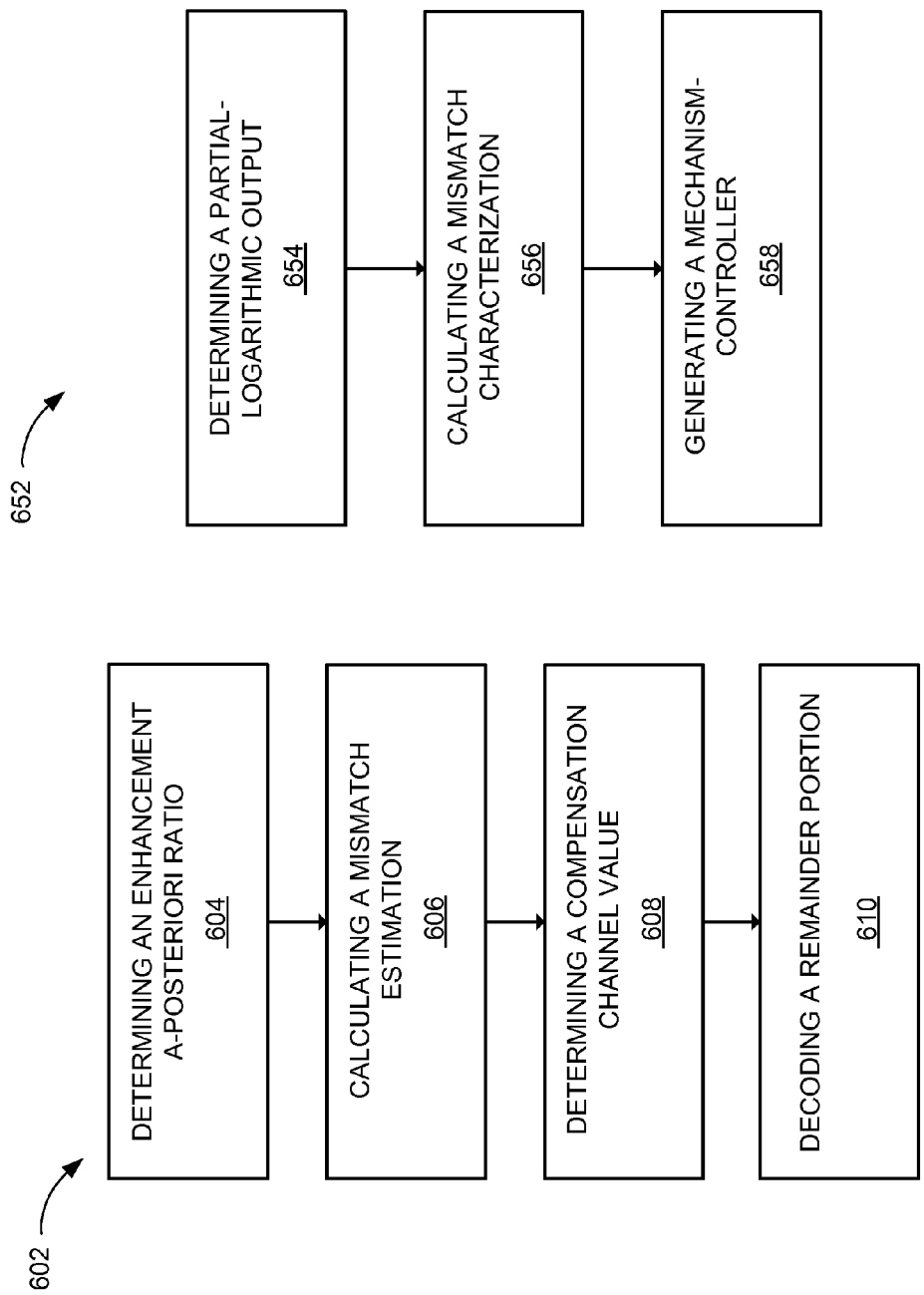
FIG. 6 is a flow chart of a method of operation of a communication system in an embodiment of the present invention.

Referring now to FIG. 6, therein is shown a flow chart of a method 602 and a method 652 of operation of a communication system 100 in an embodiment of the present invention. The method 602 includes: determining an enhancement a-posteriori ratio based on decoding an evaluation portion of a receiver message using a mismatch-insensitive mechanism limited by an initial run threshold in a block 604; calculating a mismatch estimation with a control unit based on the enhancement a-posteriori ratio in a block 606; determining a compensation channel value and a compensation extrinsic data using the mismatch estimation in a block 608; and decoding a remainder portion of the receiver message using a mismatch-sensitive mechanism with the compensation channel value and the compensation extrinsic data for communicating with a device in a block 610.

It has been discovered that the decoder-selection adjustment 326 of FIG. 3 provides reduction in required hardware and processing efficiency, and that estimating the signal-noise ratio 132 of FIG. 1 without re-encoding provides simpler complexity and lower error rates. It has further been discovered that first decoding the evaluation portion 428 of FIG. 4 limited by the initial run threshold 426 of FIG. 4 using the mismatch-insensitive mechanism 322 of FIG. 3 and decoding the remainder portion 430 of FIG. 4 using the mismatch-sensitive mechanism 318 of FIG. 3 provides lower error rates. It has also been discovered that the mismatch estimation 444 of FIG. 4, the compensation channel value 446 of FIG. 4, and the compensation extrinsic data 448 of FIG. 4 provide processing efficiency and provide increased stability without increase in the complexity.

The method 652 includes: determining a partial-sensitive output and a partial-insensitive output for a receiver message in a block 654; calculating a mismatch characterization with a control unit using the partial-log output and the partial-max output in a block 656; and generating a mechanism-controller based on the mismatch characterization for communicating with a device in a block 658.

It has been discovered that the mismatch characterization 528 of FIG. 5, the partial-insensitive output 516 of FIG. 5, and the partial-sensitive output 518 of FIG. 5 provide lower complexity and required resources for characterizing an SNR mismatch. It has further been discovered that the mismatch characterization 528, the logarithmic-probability mechanism 320 of FIG. 3, and the maximum-probability mechanism 324 of FIG. 3 provide lower error rates.

It has also been discovered that the mismatch characterization 528, the selection range 530 of FIG. 5, and the mechanism-controller 532 of FIG. 5 provide lower error rates. It has been discovered that the partial-sensitive output 518 and the partial-insensitive output 516 determined with the partial-decode controller 514 of FIG. 5 corresponding to the half iteration 306 of FIG. 3 provide increased flexibility and provide decreased error rate while maintaining or reducing the processing burden.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
an antenna configured to receive a receiver message;
a control unit, coupled to the antenna, configured to:
determine an enhancement a-posteriori ratio based on decoding an evaluation portion of the receiver message using a mismatch-insensitive mechanism limited by an initial run threshold;
calculate a mismatch estimation based on the enhancement a-posteriori ratio;
determine a compensation channel value, a compensation extrinsic data, or a combination thereof using the mismatch estimation; and
decode a remainder portion of the receiver message using a mismatch-sensitive mechanism with the compensation channel value, the compensation extrinsic data, or a combination thereof for communicating with a device.

2. The system as claimed in claim 1 wherein the control unit is configured to:
determine the enhancement a-posteriori ratio including a system component, a parity component, or a combination thereof; and
calculate the mismatch estimation using the system component without using the parity component.

3. The system as claimed in claim 1 wherein the control unit configured to:
determine a symbol vector and an initial instance of a noise variance from the receiver message; and
calculate the mismatch estimation using the symbol vector and the noise variance.

4. The system as claimed in claim 1 wherein the control unit is configured to:
determine the compensation channel value using a total channel evaluation, the enhancement a-posteriori ratio, a hard-decision mechanism, or a combination thereof from the receiver message; and
calculate the mismatch estimation using the compensation channel value or the total channel evaluation.

5. The system as claimed in claim 1 wherein the control unit is configured to:
determine a decoder-selection adjustment for adjusting between a mismatch-sensitive mechanism and a mismatch-insensitive mechanism; and
calculate a first extrinsic value, a second extrinsic value, or a combination thereof with for determining the enhancement a-posteriori ratio and further configured to decode the remainder portion with using the decoder-selection adjustment.

6. The system as claimed in claim 1 wherein the control unit is configured to:
calculate a first extrinsic value, a second extrinsic value, or a combination thereof for determining the enhancement a-posteriori ratio; and
decode the remainder portion using a decoder-selection adjustment.

7. The system as claimed in claim 1 wherein the control unit is configured to calculate the mismatch estimation using a hard-decision mechanism.

8. The system as claimed in claim 7 wherein the control unit is configured to:
determine the enhancement a-posteriori ratio including a system component, a parity component, or a combination thereof; and
calculate the mismatch estimation using the system component only, the parity component only, portions therein, or a combination thereof.

9. The system as claimed in claim 7 wherein the control unit is configured to calculate the mismatch estimation without re-encoding a system component.

10. The system as claimed in claim 7 wherein the control unit is configured to:
determine the enhancement a-posteriori ratio using a mismatch-insensitive mechanism; and
decode the remainder portion using a mismatch-sensitive mechanism.

11. The system as claimed in claim 7 wherein the control unit is configured to update the mismatch estimation, the compensation channel value, and the compensation extrinsic data based on decoding the remainder portion limited by a further run threshold.

12. The system as claimed in claim 7 further comprising:
a storage unit, coupled to the control unit, configured to store the enhancement a-posteriori ratio; and
wherein:
the control unit is configured to compensate the enhancement a-posteriori ratio with the compensation channel value, the compensation extrinsic data, or a combination thereof.

13. The system as claimed in claim 1 wherein in the control unit is configured to determine the enhancement a-posteriori ratio based on decoding the evaluation portion of the receiver message using a maximum-probability mechanism.

14. The system as claimed in claim 1 wherein in the control unit is configured to determine the enhancement a-posteriori ratio based on decoding the evaluation portion of the receiver message using the mismatch-insensitive mechanism for approximating a logarithmic-probability mechanism.

15. The system as claimed in claim 1 wherein the control unit is configured to determine a decoder-selection adjustment for adjusting between a logarithmic-probability mechanism and a maximum-probability mechanism.

16. A method of operation of a communication system comprising:
determining an enhancement a-posteriori ratio based on decoding an evaluation portion of a receiver message using a mismatch-insensitive mechanism limited by an initial run threshold;
calculating a mismatch estimation with a control unit based on the enhancement a-posteriori ratio;
determining a compensation channel value, a compensation extrinsic data, or a combination thereof using the mismatch estimation; and
decoding a remainder portion of the receiver message using a mismatch-sensitive mechanism with the compensation channel value, the compensation extrinsic data, or a combination thereof for communicating with a device.

17. The method as claimed in claim 16 wherein:
determining the enhancement a-posteriori ratio includes determining the enhancement a-posteriori ratio including a system component, a parity component, or a combination thereof; and
calculating the mismatch estimation includes calculating the mismatch estimation using the system component without using the parity component.

18. The method as claimed in claim 16 further comprising:
determining a symbol vector and an initial instance of a noise variance from the receiver message;
wherein:
calculating the mismatch estimation includes calculating the mismatch estimation using the symbol vector and the noise variance.

19. The method as claimed in claim 16 wherein:
determining the compensation channel value includes determining the compensation channel value using a total channel evaluation, the enhancement a-posteriori ratio, a hard-decision mechanism, or a combination thereof from the receiver message; and
calculating the mismatch estimation includes calculating the mismatch estimation using the compensation channel value or the total channel evaluation.

20. The method as claimed in claim 16 further comprising:
determining a decoder-selection adjustment for adjusting between a mismatch-sensitive mechanism and a mismatch-insensitive mechanism;
wherein:
determining the enhancement a-posteriori ratio includes calculating a first extrinsic value, a second extrinsic value, or a combination thereof with a module for determining the enhancement a-posteriori ratio; and
decoding the remainder portion includes decoding the remainder portion with the module using the decoder-selection adjustment.

21. The method as claimed in claim 16 wherein:
calculating a first extrinsic value, a second extrinsic value, or a combination thereof with a module for determining the enhancement a-posteriori ratio; and
decoding the remainder portion includes decoding the remainder portion with a different module using a decoder-selection adjustment.

22. The method as claimed in claim 16 wherein calculating the mismatch estimation includes calculating the mismatch estimation using a hard-decision mechanism.

23. The method as claimed in claim 22 wherein:
determining the enhancement a-posteriori ratio includes determining the enhancement a-posteriori ratio including a system component, a parity component, or a combination thereof; and
calculating the mismatch estimation includes calculating the mismatch estimation using the system component only, the parity component only, portions therein, or a combination thereof.

24. The method as claimed in claim 22 wherein calculating the mismatch estimation includes calculating the mismatch estimation without re-encoding a system component.

25. The method as claimed in claim 22 wherein:
determining the enhancement a-posteriori ratio includes determining the enhancement a-posteriori ratio using a mismatch-insensitive mechanism; and
decoding the remainder portion includes decoding the remainder portion using a mismatch-sensitive mechanism.

26. The method as claimed in claim 22 further comprising updating the mismatch estimation, the compensation channel value, and the compensation extrinsic data based on decoding the remainder portion limited by a further run threshold.

27. The method as claimed in claim 22 further comprising:
storing the enhancement a-posteriori ratio; and
wherein:
decoding the remainder portion includes compensating the enhancement a-posteriori ratio with the compensation channel value, the compensation extrinsic data, or a combination thereof.

28. The method as claimed in claim 16 wherein determining the enhance a-posteriori ratio includes determining the enhancement a-posteriori ratio based on decoding the evaluation portion of the receiver message using a maximum-probability mechanism.

29. The method as claimed in claim 16 wherein determining the enhancement a-posteriori ratio includes determining the enhancement a-posteriori ratio based on decoding the evaluation portion of the receiver message using the mismatch-insensitive mechanism for approximating a logarithmic-probability mechanism.

30. The method as claimed in claim 16 further comprising determining a decoder-selection adjustment for adjusting between a logarithmic-probability mechanism and a maximum probability mechanism.

* * * * *